US008148441B2

(12) United States Patent
Doura et al.

(10) Patent No.: US 8,148,441 B2
(45) Date of Patent: Apr. 3, 2012

(54) POLISHING PAD AND MANUFACTURING METHOD THEREOF

(75) Inventors: Masato Doura, Osaka (JP); Takeshi Fukuda, Osaka (JP); Kazuyuki Ogawa, Osaka (JP); Atsushi Kazuno, Osaka (JP); Hiroshi Seyanagi, Osaka (JP); Masahiko Nakamori, Otsu (JP); Takatoshi Yamada, Otsu (JP); Tetsuo Shimomura, Otsu (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 1162 days.

(21) Appl. No.: 11/794,284

(22) PCT Filed: Feb. 27, 2006

(86) PCT No.: PCT/JP2006/303605
§ 371 (c)(1),
(2), (4) Date: Jun. 27, 2007

(87) PCT Pub. No.: WO2006/095591
PCT Pub. Date: Sep. 14, 2006

(65) Prior Publication Data
US 2008/0085943 A1 Apr. 10, 2008

(30) Foreign Application Priority Data

| Mar. 8, 2005 | (JP) | 2005-063963 |
| Mar. 22, 2005 | (JP) | 2005-081974 |
| Mar. 22, 2005 | (JP) | 2005-081979 |
| Jun. 3, 2005 | (JP) | 2005-163791 |

(51) Int. Cl.
C08G 18/10 (2006.01)

(52) U.S. Cl. ........ 521/159; 521/110; 521/112; 521/128; 521/130; 521/131; 521/133; 521/137; 521/163

(58) Field of Classification Search .................. 521/110, 521/112, 128, 130, 131, 133, 137, 159, 163
See application file for complete search history.

(56) References Cited

U.S. PATENT DOCUMENTS

| 5,587,502 | A | 12/1996 | Moren et al. | |
| 5,614,575 | A | 3/1997 | Kotschwar | |
| 5,840,782 | A * | 11/1998 | Limerkens et al. | 521/174 |
| 6,439,989 | B1 | 8/2002 | Reinhardt et al. | |
| 6,477,926 | B1 | 11/2002 | Swisher et al. | |
| 6,706,383 | B1 | 3/2004 | Obeng et al. | |
| 6,777,455 | B2 | 8/2004 | Seyanagi et al. | |
| 6,837,781 | B2 | 1/2005 | Hishiki | |
| 6,887,911 | B2 | 5/2005 | Shidaker et al. | |
| 7,094,811 | B2 * | 8/2006 | Nodelman et al. | 521/174 |
| 2002/0016139 | A1 | 2/2002 | Hirokawa et al. | |
| 2002/0058469 | A1 | 5/2002 | Pinheiro et al. | |
| 2002/0078632 | A1 | 6/2002 | Hasegawa et al. | |
| 2002/0183409 | A1 | 12/2002 | Seyanagi et al. | |
| 2003/0109209 | A1 | 6/2003 | Hishiki | |
| 2004/0157985 | A1 | 8/2004 | Masui et al. | |
| 2004/0224622 | A1 | 11/2004 | Sakurai et al. | |
| 2004/0242719 | A1 | 12/2004 | Seyanagi et al. | |
| 2005/0064709 | A1 | 3/2005 | Shimomura et al. | |
| 2005/0171224 | A1 | 8/2005 | Kulp | |
| 2005/0176912 | A1 | 8/2005 | Shin et al. | |
| 2005/0222288 | A1 | 10/2005 | Seyanagi et al. | |
| 2006/0037699 | A1 | 2/2006 | Nakamori et al. | |
| 2006/0089095 | A1 | 4/2006 | Swisher et al. | |
| 2006/0122287 | A1 | 6/2006 | Yamamoto et al. | |
| 2006/0280929 | A1 | 12/2006 | Shimomura et al. | |
| 2006/0280930 | A1 | 12/2006 | Shimomura et al. | |
| 2007/0190905 | A1 | 8/2007 | Shimomura et al. | |
| 2008/0305720 | A1 | 12/2008 | Hirose et al. | |
| 2008/0313967 | A1 | 12/2008 | Sakurai et al. | |
| 2009/0047872 | A1 | 2/2009 | Fukuda et al. | |
| 2009/0093201 | A1 | 4/2009 | Kazuno et al. | |
| 2009/0104850 | A1 | 4/2009 | Ogawa et al. | |
| 2009/0298392 | A1 | 12/2009 | Okamoto et al. | |
| 2011/0218263 | A1 | 9/2011 | Kazuno et al. | |

FOREIGN PATENT DOCUMENTS

| CN | 1407606 | 4/2003 |
| CN | 1586002 | 2/2005 |
| CN | 1602321 | 3/2005 |
| CN | 1628138 | 6/2005 |
| EP | 0656031 | 7/1998 |
| JP | 2-91279 | 3/1990 |
| JP | 6-220151 | 8/1994 |
| JP | 8-500622 | 1/1996 |
| JP | 8-71378 | 3/1996 |
| JP | 11-511748 | 10/1999 |
| JP | 2000-17252 | 1/2000 |
| JP | 3013105 | 2/2000 |
| JP | 2000-248034 | 9/2000 |

(Continued)

OTHER PUBLICATIONS

Chinese Office Action dated Jan. 8, 2010, directed to counterpart Chinese Application No. 2006800043975; 25 pages.
International Search Report directed to counter part PCT/JP2006/303605.
Japanese Notification of Reasons for Refusal mailed Nov. 25, 2010, directed to related Japanese Patent Application No. 2006-002346; 4 pages.
Japanese Notification of Reasons for Refusal mailed Nov. 25, 2010, directed to related Japanese Patent Application No. 2006-005803; 4 pages.
Japanese Notification of Reasons for Refusal mailed May 27, 2011, directed to Japanese Application No. 2006-005787; 6 pages.
Chinese Second Office Action issued May 5, 2011, directed to Chinese Application No. 200680004397.5; 21 pages.

(Continued)

Primary Examiner — John Cooney
(74) Attorney, Agent, or Firm — Morrison & Foerster LLP

(57) ABSTRACT

A method for manufacturing a polishing pad made from a polyurethane resin foam having very uniform, fine cells therein and a polishing pad obtained by that method provides a polishing pad having better polishing characteristics (especially, in planarization) while providing improved dressability while maintaining the planarization characteristics and polishing speed of a conventional polishing pad. The polyurethane resin foam is a cured product obtained by reacting an isocyanate-terminated prepolymer with an aromatic polyamine chain extender having a melting point of 70° C. or lower, for example.

12 Claims, 1 Drawing Sheet

FOREIGN PATENT DOCUMENTS

| | | |
|---|---|---|
| JP | 2000-343412 | 12/2000 |
| JP | 2001-47355 | 2/2001 |
| JP | 2001-89548 | 4/2001 |
| JP | 2001-105300 | 4/2001 |
| JP | 2001-513450 | 9/2001 |
| JP | 2001-277101 | 10/2001 |
| JP | 2001-518852 | 10/2001 |
| JP | 2002-59358 | 2/2002 |
| JP | 2002-134445 | 5/2002 |
| JP | 2002-144220 | 5/2002 |
| JP | 2003-171433 | 6/2002 |
| JP | 2002-239905 | 8/2002 |
| JP | 3455187 | 8/2002 |
| JP | 2002-535843 | 10/2002 |
| JP | 3359629 | 10/2002 |
| JP | 2003-11066 | 1/2003 |
| JP | 2003-62748 | 3/2003 |
| JP | 2003-89051 | 3/2003 |
| JP | 2003-128910 | 5/2003 |
| JP | 2003-145414 | 5/2003 |
| JP | 2003-218074 | 7/2003 |
| JP | 3490431 | 11/2003 |
| JP | 3516874 | 1/2004 |
| JP | 3571334 | 2/2004 |
| JP | 2004-75700 | 3/2004 |
| JP | 2004-167680 | 6/2004 |
| JP | 2004-188716 | 7/2004 |
| JP | 2004-193390 | 7/2004 |
| JP | 2004-211076 | 7/2004 |
| JP | 2004-330411 | 11/2004 |
| JP | 2005-52907 | 3/2005 |
| JP | 2005-68174 | 3/2005 |
| JP | 2005-68175 | 3/2005 |
| JP | 2005-120275 | 5/2005 |
| JP | 2005-517060 | 6/2005 |
| WO | WO-94/04599 | 3/1994 |
| WO | WO-96/38453 | 12/1996 |
| WO | WO-98/45087 | 10/1998 |
| WO | WO-99/07515 | 2/1999 |
| WO | WO-00/43159 | 7/2000 |
| WO | WO-01/96434 | 12/2001 |
| WO | WO-02/24415 | 3/2002 |
| WO | WO-02/083757 | 10/2002 |
| WO | WO-03/043071 | 5/2003 |
| WO | WO-03/066703 | 8/2003 |
| WO | WO-2004/049417 | 6/2004 |
| WO | WO-2004/055089 | 7/2004 |

OTHER PUBLICATIONS

Japanese Notification of Reasons for Refusal mailed Jul. 12, 2011, directed to Japanese Application No. 2006-002346; 6 pages.
Chinese Rejection Decision mailed Jul. 29, 2011, directed to Chinese Application No. 200910135487.3; 14 pages.
Japanese Notification of Reasons for Refusal mailed Aug. 9, 2011, directed to U.S. Application No. 2005-249046; 6 pages.
Japanese Notification of Reasons for Refusal mailed Aug. 17, 2011, directed to U.S. Application No. 2006-006210; 5 pages.
International Search Report mailed Aug. 8, 2006 directed to Application No. PCT/JP2006/309380;11 pages.
International Search Report mailed Nov. 21, 2006, directed to Application No. PCT/JP2006/316372; 4 pages.
International Preliminary Report on Patentability, mailed Mar. 13, 2008, directed to Application No. PCT/JP2006/316372; 6 pages.
Chinese Office Action mailed May 8, 2009, directed to Chinese Application No. 2006800321010; 5 pages.
Chinese Office Action issued Nov. 21, 2008, directed to Chinese Application No. 200680017384.1; 9 pages.
Chinese Office Action issued Jul. 10, 2009, directed to Application No. 200680017384.1; 6 pages.
Chinese Office Action issued Mar. 23, 2010, directed to Chinese Application No. 200910135488.8; 13 pages.
Chinese Office Action issued Apr. 22, 2010, directed to Chinese Application No. 200910135487.3; 17 pages.
Chinese Second Office Action issued Apr. 13, 2011, directed to Chinese Application No. 200910135487.3; 16 pages.
Chinese Second Office Action mailed Nov. 23, 2010, directed to Chinese Application No. 200910135488.8; 14 pages.
Japanese Notification of Reasons for Refusal mailed Mar. 15, 2011, directed to Japanese Application No. 2005-144304; 6 pages.
Japanese Notification of Reasons for Refusal mailed Mar. 15, 2011, directed to Japanese Application No. 2005-144292; 6 pages (with English translation).
Japanese Notification of Reasons for Refusal mailed Mar. 15, 2011, directed to Japanese Application No. 2005-144318; 6 pages.
Taiwanese Office Action mailed Nov. 17, 2010, directed to Taiwanese Application No. 096100913; 7 pages.
International Preliminary Report on Patentability and Written Opinion mailed Jul. 24, 2008, directed to Application No. PCT/JP2007/050072; 11 pages.
International Search Report mailed Mar. 6, 2007, directed to Application No. PCT/JP2007/050072; 3 pages.
Matsunaga, Katsuharu. (2005). "Hard Foam" Section 7.4.3. *In The Comprehensive Materials and Technology for a Novel Polyurethan Production.* First Print, Kabushiki Kaisha CMC Shuppan, pp. 107-108.
Decision of Refusal mailed Jun. 24, 2011, directed to Japanese Application No. 2005-144304; 4 pages (with English translation).
Decision of Refusal mailed Jun. 28, 2011, directed to Japanese Application No. 2005-144292; 4 pages (with English translation).
Decision of Refusal mailed Jun. 28, 2011, directed to Japanese Application No. 2005-144318; 4 pages (with English translation).
Kazuno et al., U.S. Office Action mailed Dec. 6, 2010, directed to U.S. Appl. No. 11/914,547; 15 pages.
Kazuno et al., U.S. Office Action mailed Jun. 23, 2011, directed to U.S. Appl. No. 11/914,547; 12 pages.
Ogawa et al., U.S. Office Action mailed Dec. 21, 2010, directed to U.S. Appl. No. 12/065,219; 10 pages.
Ogawa et al., U.S. Office Action mailed May 11, 2011, directed to U.S. Appl. No. 12/065,219; 11 pages.
Fukuda et al., U.S. Office Action mailed Jun. 8, 2011, directed to U.S. Appl. No. 12/095,859; 7 pages.
Korean Office Action mailed Jul. 7, 2011, directed to Korean Application No. 10-2009-7013449; 5 pages.
Korean Office Action mailed Jul. 7, 2011, directed to Korean Application No. 10-2009-7013450; 6 pages.
Chinese $3^{rd}$ Office Action mailed Aug. 29, 2011, directed to Chinese Patent Application No. 200680004397.5; 16 pages.
Notice of Hearing mailed Nov. 29, 2011, directed towards Japanese Application No. 2005-144304; 6 pages.
Taiwanese Office Action mailed Nov. 24, 2011, directed to counterpart Taiwanese Application No. 097109615; 10 pages.

* cited by examiner

POLISHING PAD AND MANUFACTURING METHOD THEREOF

REFERENCE TO RELATED APPLICATIONS

This application is a national stage application under 35 USC 371 of International Application No. PCT/JP2006/303605, filed Feb. 27, 2006, which claims priority from Japanese Patent Application Nos. 2005-063963, No. 2005-081974, 2005-081979 and 2005-163791, filed Mar. 8, 2005, Mar. 22, 2005, Mar. 22, 2005, and Jun. 3, 2005, respectively, the disclosures of which are incorporated herein by reference.

FIELD OF THE INVENTION

The invention relates to a polishing pad capable of performing planarization of materials requiring a high surface planarity such as optical materials including a lens and a reflecting mirror, a silicon wafer, a glass substrate or an aluminum substrates for a hard disc and a product of general metal polishing with stability and a high polishing efficiency. A polishing pad of the invention is preferably employed, especially, in a planarization step of a silicon wafer or a device on which an oxide layer or a metal layer has been formed prior to further stacking an oxide layer or a metal layer thereon.

BACKGROUND OF THE INVENTION

Typical materials requiring surface flatness at high level include a single-crystal silicon disk called a silicon wafer for producing semiconductor integrated circuits (IC, LSI). The surface of the silicon wafer should be flattened highly accurately in a process of producing IC. LSI etc., in order to provide reliable semiconductor connections for various coatings used in manufacturing the circuits. In the step of polishing finish, a polishing pad is generally stuck on a rotatable supporting disk called a platen, while a workpiece such as a semiconductor wafer is stuck on a polishing head. By movement of the two, a relative speed is generated between the platen and the polishing head while polishing slurry having abrasive grains is continuously supplied to the polishing pad, to effect polishing processing.

As techniques manufacturing a polyurethane foam, which is a material of a polishing pad, methods have been known, in one of which an organic solvent with a low boiling point such as fleon or methylene chloride is added and dispersed into a foam forming raw composition to foam a polymer by gasification thereof due to polymerization heat and in the other of which water is added and dispersed into a foam forming raw composition to foam a polymer with carbon dioxide generated by the reaction of water with an isocyanate group. Foams obtained by means of the methods have cells with the lower limit of an average diameter of 100 μm therein, thereby having encountered a difficulty obtaining a foam with more finer, uniform cells.

As manufacturing methods of polyurethane foam with fine cells therein, the following methods have been known:
(1) a method in which solvent soluble fine particles are dispersed into a polyurethane polymer, the polymer is molded into a predetermined shape and thereafter, the molded intermediate is immersed into a solvent in which the polyurethane polymer is not dissolved but the fine particles are dissolved to thereby dissolve and remove the fine particles and to form porous polyurethane resin, that is a foam (Patent Literature 1), and
(2) a method in which fine-cavity foams are dispersed into a polyurethane resin forming raw composition (Patent Literatures 2 and 3).

According to the method of Patent Literature 1, however, a great quantity of a solvent is required and a treatment of the solvent containing a fine particle forming material is further required, which entails a high cost. An obtained foam contains only open cells and cannot be used in application requiring rigidity, which imposes limitation on application. What's worse, a necessity arises even for a step of elution and a step of evaporating a solvent, which has leads to a problem of calling for a long time in fabrication of a molded product with a large thickness.

On the other hand, in the methods of Patent Literatures 2 and 3, since fine-cavity foams have a great tendency to float up in a raw polyurethane reaction liquid due to a difference in density, a difficulty is encountered manufacturing a uniform foam, the fine-cavity foams are comparatively expensive and a material of the fine-cavity foams remains in the foam in a product, thereby having resulted in problems of giving damage to a blade in cutting the foam and the like. Moreover, the fine cavity foams are easy to fly away, which requires a great cost in installing facilities for keeping a working environment in a good condition.

A polyurethane resin foam is employed as a polishing pad used in fabrication of a silicon substrate for manufacturing a semiconductor device or the like and fabrication of an electronic substrate. A high precision polishing is demanded to a polishing pad in company with a progress toward a higher compactness in formed circuitry, and a hardness or the like of a polishing pad (a polyurethane foam) is requested so as to be adapted for a kind and particle diameters of particles contained in a polishing slurry used in polishing. For example, a ceria-based slurry is larger in particle diameter than a silica-based slurry and in a case where a ceria-based slurry is employed as a polishing slurry, it requires a polishing pad with a higher hardness than in a case where a silica-based slurry.

As a method of solving the problems, a production method, or a so-called mechanical foaming method, has been disclosed of a polyurethane foam having uniform, fine cells and with a higher hardness than a polyurethane foam with the same density, produced without using a foreign material such as a chemically reactive foaming agent including water, a gasification expansible foaming agent including fleon, fine-cavity foams, a solvent soluble material or the like (Patent Literature 4). As a chain extender, 4,4'-methylenebis(o-chloroaniline)(MOCA) is preferably used from the viewpoint of a reactivity and a physical property and the like of an obtained polyurethane foam. However, in a case where MOCA is used, a problem has arisen that a cell diameter in a polyurethane resin foam is larger and easy to cause fluctuations in the diameter, exerting an adverse influence on polishing characteristics.

As polishing characteristics of a polishing pad, on the other hand, it is requested that a polished object is excellent in planarity and in-plane uniformity and a polishing speed is large. A planarity and in-plane uniformity of a polished object can be improved to some extent with a polishing layer higher in elastic modulus. A polishing speed can be bettered by increasing a holding quantity of a slurry on a foam with cells therein.

As a polishing pad satisfying the above characteristics, a proposal has been offered of a polishing pad made from a polyurethane resin foam (Patent Literatures 5 to 8). The polyurethane resin foam is produced by reacting an isocyanate polymer with a chain extender (a curing agent) and as chain extenders, 4,4'-methylenebis(o-chloroaniline) (hereinafter, referred to as MOCA) is preferably employed from the viewpoint of a reactivity and a physical property and the like of an obtained polyurethane foam.

Since MOCA contains chlorine in a molecule thereof, however, and has a demerit in an environmental aspect: generation of a harmful material such as dioxin in disposal as waste, there is a possibility that usage is limited or prohibited in the future. Hence, a desire has been built up for development of a polishing pad containing no halogen.

As a high-molecular polyol component of an isocyanate prepolymer, polyether (polytetramethylene glycol with a number-average molecular weight in the range of from 500 to 1600) or a polycarbonate is preferably employed from the viewpoint of hydrolysis resistance, elastic characteristic, abrasion resistance and the like.

After planarization of many of semiconductor wafers using one polishing pad, fine depressions and protrusions on a surface of the polishing pad are worn away, resulting in reduction in performance to feed a polishing agent (a slurry) onto a polishing surface of a semiconductor wafer, decrease in planarization speed on a wafer polishing surface and besides, degradation in planarization characteristic. Therefore, after planarization of a predetermined number of semiconductor wafers are effected, the surface of the polishing pad is necessary to be renewed and roughened (dressing) with a dresser. A predetermined time of dressing generates numberless fine depressions and protrusions on the surface of the polishing pad and the surface of the pad is transformed into a fluffy state.

A conventional polishing pad, however, has had a problem that a dressing speed is low in dressing and a dressing time is excessively consumed.

Patent Literature 1: JP 2-91279 A
Patent Literature 2: JPN 8-500622 A
Patent Literature 3: JP 2000-343412 A
Patent Literature 4: JP 3490431
Patent Literature 5: JP 3013105
Patent Literature 6: JP 3516874
Patent Literature 7: JP 2000-17252 A
Patent Literature 8: JP 3359629

SUMMARY OF THE INVENTION

It is an object of a first invention to provide a manufacturing method of a polishing pad made from a polyurethane resin foam having very uniform, fine cells therein and a polishing pad obtained by means of the manufacturing method. It is an object of second and third inventions to provide a polishing pad more excellent in polishing characteristics (especially, a planarization characterization) than a conventional polishing pad and having no halogen therein, and a manufacturing method thereof. It is an object of a fourth invention to provide a polishing pad improved on dressability while a planarization characteristic and a polishing speed of a conventional polishing pad is maintained. It is an object of the invention to provide a fabrication method of a semiconductor device using any of the polishing pads.

The inventors have conducted serious studies in order to solve the problems with a resultant discovery that the problems can be solved with the following polishing pads and manufacturing methods thereof, which has lead to completion of the invention.

The first invention relates to a manufacturing method of a polishing pad including a step (1) of mixing a first component containing an isocyanate-terminated prepolymer into a second component containing a chain extender for curing to produce a polyurethane resin foam, wherein the step (1) is a step of adding a silicone-based surfactant into the first component so as to be in the range of 0.05 to 10 wt % in a polyurethane resin foam, agitating the first component together with a non-reactive gas to thereby prepare a cell dispersion liquid in which the non-reactive gas is dispersed as fine cells and thereafter mixing the second component into the cell dispersion liquid for curing to thereby produce a polyurethane resin foam, and wherein a chain extender is an aromatic polyamine with a melting point of 70° C. or lower.

According to the manufacturing method, it is possible to obtain a polyurethane resin foam having a very uniform, fine cell structure.

The inventors have found that a polyurethane resin foam having fine cells small in fluctuation in diameter therein is obtained by using an aromatic polyamine with a melting point of 70° C. or lower instead of MOCA conventionally having been used with preference. The reason therefor is inferred in the following way: A melting point of MOCA is 106° C. and MOCA is mixed into a cell dispersion liquid in a molten state (at about 120° C.). The cell dispersion liquid is usually adjusted at a temperature of the order in the range of 60 to 80° C., wherein since a difference in temperature from MOCA in a molten state is large, cells in the cell dispersion liquid are locally broken by heat and integrated and expanded. It is thought, as a result, that fluctuations in cell diameter occur. With an aromatic polyamine with a melting point of 70° C. or lower as a chain extender employed, a difference in temperature from the cell dispersion liquid can be less, thereby enabling fluctuations in cell diameter to be suppressed. A melting point of an aromatic polyamine is preferably 60° C. or lower and especially preferably 40° C. or lower.

In the first invention, an aromatic polyamine, from the viewpoint of a reactivity and a physical property of an obtained polyurethane resin foam, is preferably at least one kind selected from the group consisting of 3,5-bis(methylthio)-2,4-toluenediamine, 3,5-bis(methylthio)-2,6-toluenediamine, 3,5-diethyl-2,4-toluenediamine, 3,5-diethyl-2,6-toluenediamine, N,N'-di-sec-butyl-4,4'-diaminodiphenylmethane, 3,3'-diethyl-4,4'-diaminodiphenylmethane, m-xylylenediamine, N,N'-di-sec-butyl-p-phenylenediamine, m-phenylenediamine, p-xylylenediamine, and a polyalkylene oxide-di-p-aminobenzoate expressed by the following general formula (1).

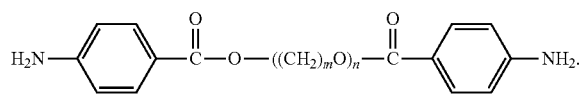

(1)

wherein m is an integer from 2 to 4 and n is an integer from 1 to 20.

In the first invention, it is necessary to contain a silicone-based surfactant in a polyurethane resin foam in the range of from 0.05 to 10 wt % and preferably in the range of from 0.5 to 5 wt %. If a content of a silicone-based surfactant is less than 0.05 wt %, it is unpreferable since a fine cell foam cannot be obtained. On the other hand, if a content of a silicone-based surfactant exceeds 10 wt %, it is unpreferable since a polyurethane resin foam with a high hardness is not obtained by a plasticization effect of the surfactant.

In the first invention, the isocyanate-terminated prepolymer preferably contains a low-molecular-weight polyol as a raw material component.

In the first invention, an isocyanate component, which is a raw material component of the isocyanate-terminated prepolymer, is preferably an aromatic diisocyanate and an alicyclic diisocyanate. It is preferable that an aromatic diisocyanate is toluene diisocyanate and that an alicyclic diisocyanate is dicyclohexylmethane diisocyanate. The use of the diisocyanate is preferable not only in terms of operability but also moldability of a polyurethane resin foam since a reaction speed with a chain extender can be controlled in a preferable range.

The first invention relates to a polishing pad manufactured by means of the method.

The second invention relates to a polishing pad having a polishing layer made from a polyurethane resin foam, wherein the polyurethane resin foam is a reaction-cured product between an isocyanate-terminated pre polymer containing an isocyanate component and a high-molecular-weight polyol and an chain extender containing an ethylene oxide adduct and/or a propylene oxide adduct with at least one kind of an aromatic diol selected from the group consisting of hydroquinone, resorcin, p-xylylene glycol and bisphenol A.

The inventors have found that a halogen free polishing pad improved on a planarization characteristic as compared with a conventional polishing pad by using an ethylene oxide (EO) adduct and/or a propylene oxide (PO) adduct (hereinafter also referred to as aromatic diol EO/PO adduct) with at least one kind of an aromatic diol selected from the group consisting of hydroquinone, resorcin, p-xylylene glycol and bisphenol A as a chain extender instead of MOCA.

In the second invention, the isocyanate component constituting an isocyanate-terminated prepolymer preferably contains an aromatic isocyanate at a content of 90 mol % or more. The aromatic isocyanate is preferably diphenylmethane diisocyanate.

In the second invention, the high-molecular-weight polyol constituting an isocyanate-terminated prepolymer is preferably polytetramethylene ether glycol with a number-average molecular weight in the range of from 500 to 1500.

The isocyanate-terminated prepolymer preferably contains a low-molecular-weight polyol as a raw material component.

Since, with a prepolymer used, a reaction speed with an aromatic diol EO/PO adduct, which is a chain extender, can be adjusted in a preferable range, the use of the prepolymer is preferable not only in terms of operability but also from the viewpoint of moldability of a polyurethane resin foam. A polishing pad using the specific material is especially excellent in effect of improvement on a planarization characteristic.

The aromatic diol EO/PO adduct is preferably an adduct obtained by adding EO and/or PO to an aromatic diol in the range of 2 to 4 mol per 1 mol of the aromatic diol.

The second invention relates to a manufacturing method of a polishing pad including a step (1) of mixing a first component containing an isocyanate-terminated prepolymer into a second component containing a chain extender for curing to thereby produce a polyurethane resin foam, wherein the step (1) is a step of adding a silicone-based surfactant into the first component containing an isocyanate-terminated prepolymer so as to be in the range of from 0.05 to 10 wt % in the polyurethane resin foam, agitating the first component together with a non-reactive gas to thereby prepare a cell dispersion liquid in which the non-reactive gas is dispersed as fine cells and thereafter mixing the second component containing a chain extender into the cell dispersion liquid for curing to produce a polyurethane resin foam, and the chain extender is an chain extender containing an ethylene oxide adduct and/or a propylene oxide adduct with at least one kind of an aromatic diol selected from the group consisting of hydroquinone, resorcin, p-xylylene glycol and bisphenol A.

According to the manufacturing method, it is possible to obtain a very hard polyurethane resin foam with a very uniform, fine cell structure. Hence, a polishing pad using the polyurethane resin foam is more excellent in planarization characteristic as compared with a conventional polishing pad.

In the manufacturing method, an isocyanate component constituting an isocyanate-terminated prepolymer preferably contains an aromatic isocyanate at a content of 90 mol % or more. An aromatic isocyanate is preferably diphenylmethane diisocyanate.

In the manufacturing method, a high-molecular-weight polyol constituting an isocyanate-terminated prepolymer is preferably polytetramethylene ether glycol with a number-average molecular weight in the range of from 500 to 1500.

In the manufacturing method, an isocyanate-terminated prepolymer preferably contains a low-molecular-weight polyol as a raw material component.

In the manufacturing method, an aromatic diol EO/PO adduct is an adduct obtained by adding EO and/or PO to an aromatic diol in the range of from 2 to 4 mol per 1 mol of the aromatic diol.

A silicone-based surfactant is necessary to be added into a polyurethane resin foam in the range of from 0.05 to 10 wt % and preferably in the range of 0.5 to 10 wt %. If a content of a silicone-based surfactant is less than 0.05 wt %, a tendency arises that a fine cell foam is not obtained. On the other hand, if a content thereof exceeds 10 wt %, the number of cells in a foam is excessively large, leading to a tendency of obtaining a highly hard polyurethane resin foam with difficulty.

The third invention relates to a polishing pad having a polishing layer made from a polyurethane resin foam, wherein the polyurethane resin foam is a reaction-cured product between an aliphatic and/or alicyclic isocyanate-terminated prepolymer and a chain extender containing at least one kind of a halogen free aromatic amine selected from the group consisting of compounds expressed by the following general formulae (2) to (4):

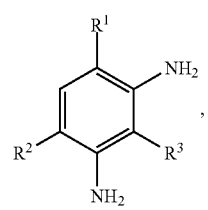

(2)

wherein in the general formula (2), $R^1$ to $R^3$, each independently of the others, an alkyl group having 1 to 3 carbon atoms or a methylthio group,

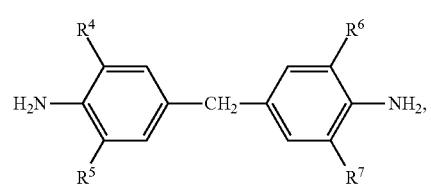

(3)

wherein in the general formula (3), $R^4$ to $R^7$, each independently of the others, H or an alkyl group having 1 to 4 carbon atoms, and

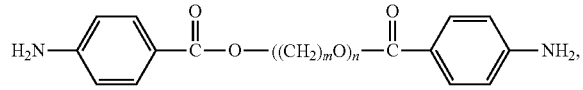

(4)

wherein m is an integer from 2 to 4 and n is an integer from 1 to 20.

The inventors has found that a halogen free aromatic amine expressed the general formulae (2) to (4) is used instead of MOCA, and an isocyanate-terminated prepolymer having an aliphatic and/or an alicyclic isocyanate as a raw material is used to thereby obtain a halogen free polishing pad with an improved planarization characteristic as compared with a conventional polishing pad.

In the third invention, halogen free aromatic amines expressed by the general formula (2) are preferably 3,5-diethyl-2,4-toluenediamine, 3,5-diethyl-2,6-toluenediamine, 3,5-bis(methylthio)-2,4-toluenediamine and 3,5-bis(methylthio)-2,6-toluenediamine. Halogen free aromatic amines expressed by the general formula (3) are preferably 4,4'-diaminodiphenylmethane, 4,4'-diamino-3,3'-diethyl-5,5'-dimethyldiphenylmethane, 4,4'-diamino-3,3',5,5'-tetraethyldiphenylmethane, 4,4'-diamino-3,3'-diisopropyl-5,5'-dimethyldiphenylmethane and 4,4'-diamino-3,3',5,5'-tetraisopropyldiphenylmethane. Halogen free aromatic amines expressed by the general formula (4) are preferably trimethylene glycol-di-p-aminobenzoate and polytetramethylene oxide-di-p-aminobenzoate.

An isocyanate component constituting the alicyclic isocyanate-terminated prepolymer is preferably 4,4'-dicyclohexylmethane diisocyanate.

A high-molecular-weight polyol constituting the aliphatic and/or alicyclic isocyanate-terminated prepolymer is preferably polytetramethylene ether glycol with a number-average molecular weight in the range of from 500 to 1500.

The aliphatic and/or alicyclic isocyanate-terminated prepolymer preferably contains a low-molecular-weight polyol as a raw material component.

Since, with a prepolymer described above used, a reaction speed with a chain extender can be controlled in a preferable range, the use of the prepolymer is preferable not only in terms of operability but also from the viewpoint of moldability of a polyurethane resin foam. A polishing pad using the specific material is especially excellent in effect of improvement on a planarization characteristic.

The third invention relates to a manufacturing method of a polishing pad including a step (1) of mixing a first component containing an isocyanate-terminated prepolymer into a second component containing a chain extender for curing to produce a polyurethane resin foam, wherein the step (1) is a step of adding a silicone-based surfactant into the first component containing isocyanate-terminated prepolymer so as to be in the range of from 0.05 to 10 wt % in the polyurethane resin foam, agitating the first component together with a non-reactive gas to thereby prepare a cell dispersion liquid in which the non-reactive gas is dispersed as fine cells and thereafter mixing the second component containing a chain extender into the cell dispersion liquid for curing to produce a polyurethane resin foam, and the isocyanate-terminated prepolymer is an aliphatic and/or alicyclic isocyanate-terminated prepolymer and the chain extender is an chain extender containing at least one kind of a halogen free aromatic amine selected from the group consisting of compounds expressed by the following general formulae (2) to (4):

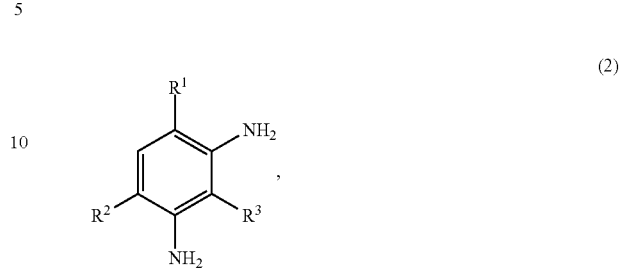

(2)

wherein in the general formula (2), $R^1$ to $R^3$, each independently of the others, an alkyl group having 1 to 3 carbon atoms or a methylthio group,

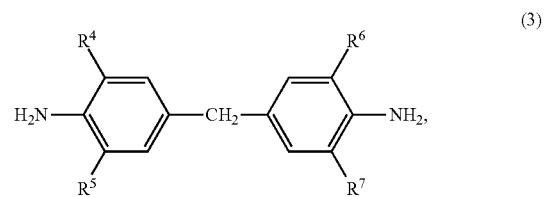

(3)

wherein in the general formula (3), $R^4$ to $R^7$, each independently of the others, H or an alkyl group having 1 to 4 carbon atoms, and

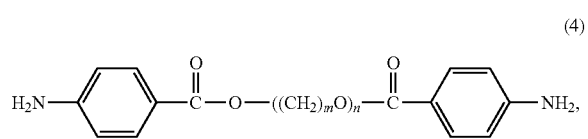

(4)

wherein m is an integer from 2 to 4 and n is an integer from 1 to 20.

According to the manufacturing method, it is possible to obtain a highly hard polyurethane resin foam with a very uniform, fine cell structure. Hence, a polishing pad using the polyurethane resin foam is more excellent in planarization characteristic as compared with a conventional polishing pad.

In the manufacturing method, halogen free aromatic amines expressed by the general formula (2) are preferably 3,5-diethyl-2,4-toluenediamine, 3,5-diethyl-2,6-toluenediamine, 3,5-bis(methylthio)-2,4-toluenediamine and 3,5-bis(methylthio)-2,6-toluenediamine. Halogen free aromatic amines expressed by the general formula (3) are preferably 4,4'-diaminodiphenylmethane, 4,4'-diamino-3,3'-diethyl-5,5'-dimethyldiphenylmethane, 4,4'-diamino-3,3',5,5'-tetraethyldiphenylmethane, 4,4'-diamino-3,3'-diisopropyl-5,5'-dimethyldiphenylmethane and 4,4'-diamino-3,3',5,5'-tetraisopropyldiphenylmethane. Halogen free aromatic amines expressed by the general formula (4) are preferably trimethylene glycol-di-p-aminobenzoate and polytetramethylene oxide-di-p-aminobenzoate.

In the manufacturing method, an isocyanate component constituting an alicyclic isocyanate-terminated prepolymer is preferably 4,4'-dicyclohexylmethane diisocyanate.

In the manufacturing method, a high-molecular-weight polyol constituting an aliphatic and/or alicyclic isocyanate-terminated prepolymer is preferably polytetramethylene ether glycol with a number-average molecular weight in the range of from 500 to 1500.

In the manufacturing method, an aliphatic and/or alicyclic isocyanate-terminated prepolymer preferably contains a low-molecular-weight polyol as a raw material component.

A silicone-based surfactant is necessary to be added into a polyurethane resin foam so as to be contained in the range of from 0.05 to 10 wt % and preferably in the range of from 0.5 to 10 wt %. If a content of a silicone-based surfactant is less than 0.05 wt %, a tendency arises that a fine cell foam is not obtained. On the other hand, if a content thereof exceeds 10 wt %, a tendency arises that difficulty is encountered obtaining a highly hard polyurethane resin foam due to a plasticization effect of the surfactant.

The silicone-based surfactant is preferably in the range of from 1000 to 6000 in weight-average molecular weight and preferably contains a silicone resin with a ratio of ethylene oxide/propylene oxide in a molecule thereof (molar ratio) is in the range of from 70/30 to 100/0. The silicone resin preferably has a hydroxyl group at the terminal end of a side chain of a siloxane skeleton. The use of a silicone-based surfactant containing the silicone resin enables a polyurethane resin foam having a more uniform, fine cell structure to be obtained. Hence, a polishing pad of the invention is more excellent in polishing rate and in-plane uniformity than a conventional polishing pad.

The fourth invention relates to a polishing pad having a polishing layer made from a polyurethane resin foam having fine cells therein, wherein an isocyanate component, which is a raw material for a polyurethane resin foam described above, is a polymerized diisocyanate and an aromatic diisocyanate.

A polishing pad of the fourth invention is a polishing pad improved on dressability while a planarization characteristic and polishing speed of a conventional polishing pad is maintained. Since, with a polishing pad of the fourth invention used, a dressing time is shortened; therefore, a fabrication efficiency of semiconductor wafers can be drastically improved. As reasons for difficulty in dressing of a conventional polishing pad, two reasons can be shown up, 1) one of which is a high specific gravity of a polishing layer and 2) the other of which is the existence of "tenacity" in a material itself of the polishing layer. Though it is thought that a specific gravity has only to be lowered in order to make a surface of the polishing layer dressed with ease, simple lowering of a specific gravity renders a hardness of all of the polishing pad lower, unpreferably leading to degradation of a planarization characteristic. In order to maintain a hardness with reduction in specific gravity, it is conceived that a molecular weight of a high-molecular-weight polyol is decreased, but in that case, a surface wear gets larger than necessary, thereby reducing a life of a polishing pad or decreasing a polishing speed because of immediate removal of fluffiness on the surface of the polishing pad after dressing.

The inventors have found that a "tenacity" of a material itself can be decreased while a high hardness is maintained by using a polymerized diisocyanate and an aromatic diisocyanate combined as an isocyanate component, which is a raw material of a polyurethane resin foam.

A polyurethane resin foam described above is preferably a reaction-cured product of an isocyanate-terminated prepolymer containing a polymerized diisocyanate and an aromatic diisocyanate with a chain extender. A polyurethane resin foam obtained by means of a prepolymer method is preferable because of excellency in polishing characteristics.

A weight ratio in content of a polymerized diisocyanate and an aromatic diisocyanate is preferably in the range of from 1/99 to 65/35 and more preferably in the range of from 5/95 to 50/50 (former/latter). If a mixing content of a polymerized diisocyanate is less than 1 wt %, a "tenacity" of a polyurethane resin itself cannot be sufficiently reduced; therefore, a dressability of a polishing layer cannot be sufficiently improved. A pot life in reaction between an isocyanate component and a chain extender is shortened, leading to a tendency of degradation in handlability. On the other hand, a mixing content of a polymerized diisocyanate exceeds 65 wt %, a dressing speed is excessively larger, unpreferably resulting in a shorter life of a polishing pad.

In the fourth invention, it is preferable that a polymerized diisocyanate is a polymerized aliphatic diisocyanate and an aromatic diisocyanate is toluene diisocyanate. The polymerized aliphatic diisocyanate is especially preferably a polymerized hexamethylene diisocyanate. With both diisocyanates used, a polyurethane resin foam can be produced with a good handlability and a planarization characteristic and a dressability can be improved without reducing a polishing speed. Preferable is an urethane-modified polymerized diisocyanate. Polishing characteristics such as a planarization characteristic can be improved by using urethane-modified polymerized diisocyanate.

A specific gravity of a polyurethane resin foam is preferably in the range of from 0.5 to 1.0 and more preferably in the range of from 0.7 to 0.9. If a specific gravity is less than 0.5, various tendencies arise that a hardness of all of the polishing layer is decreased to thereby deteriorate a planarization characteristic, a life of a polishing pad is shortened because of a larger surface wear of a polishing layer than necessary and a polishing speed is rendered smaller because of immediate removal of fluffiness on the surface of a polishing pad after dressing during polishing. On the other hand, if a specific gravity exceeds 1.0, dressability of a polishing layer cannot be sufficiently improved.

A polyurethane resin foam is preferably in the range of from 45 to 65 degrees and more preferably in the range of from 50 to 60 degrees in Asker D hardness. If an Asker D hardness is less than 45 degrees, a planarity of an object to be polished tends to be degraded. On the other hand, if an Asker D hardness is larger than 65 degrees, a tendency arises that a planarity is good but in-plane uniformity of an object to be polished is reduced. Scratches are easy to be caused on the surface of a polished object.

In the fourth invention, a polyurethane resin foam described above preferably contains a silicone-based nonionic surfactant in the range of from 0.05 to 10 wt % and more preferably in the range of from 0.5 to 5 wt %. If a content of a silicone-based nonionic surfactant is less than 0.05 wt %, a tendency arises that a fine-cell foam is not obtained. On the other hand, if a content thereof exceeds 10 wt %, a tendency arises that difficulty is encountered obtaining a highly hard polyurethane resin foam due to a plasticization effect of the surfactant.

A dressing speed of a polishing pad of the fourth invention is preferably in the range of from 4.5 to 10 μm/min and more preferably in the range of from 5 to 8 μm/min. If a dressing speed is less than 4.5 μm/min, an effect of shortening a dressing time is insufficient; therefore, it is difficult to improve a fabrication efficiency for semiconductor wafers. On the other hand, if a dressing speed exceeds 10 μm/min, a surface wear of a polishing layer is more than necessary, resulting in a tendency that a life of a polishing pad is shortened and fluffiness on the surface of the polishing layer after dressing is immediately removed during wafer polishing, thereby reducing a polishing speed.

The invention relates to a fabrication method of a semiconductor device including a step of polishing a surface of a semiconductor wafer using any of the polishing pads.

DETAILED DESCRIPTION OF THE INVENTION

Figure 1:
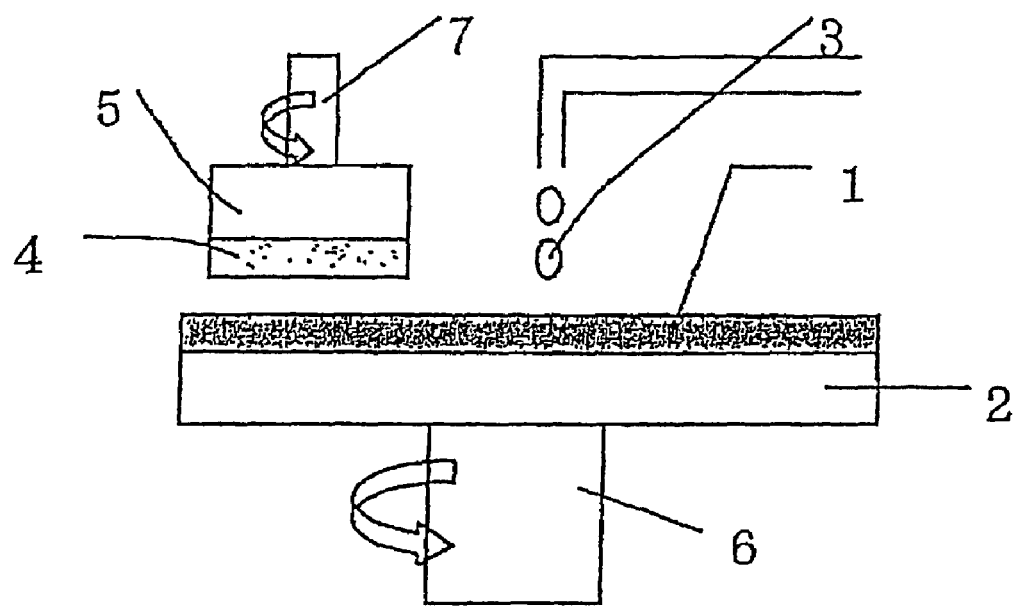
FIG. 1 is a schematic view showing an example of construction of a polishing apparatus used in CMP.

A polishing pad of the invention may be either only a polishing layer made from a polyurethane resin foam or a laminate of the polishing layer and another layer (for example, a cushion layer).

An isocyanate-terminated prepolymer used in the first and second inventions contains at least an isocyanate component and a high-molecular-weight polyol as raw material components. With an isocyanate-terminated prepolymer used, an obtained polyurethane resin foam is excellent in physical properties.

As the isocyanate component, a compound known in the field of polyurethane can be used without particular limitation. The isocyanate component includes, for example, aromatic diisocyanates such as 2,4-toluene diisocyanate, 2,6-toluene diisocyanate, 2,2'-diphenyl methane diisocyanate, 2,4'-diphenyl methane diisocyanate, 4,4'-diphenyl methane diisocyanate, 1,5-naphthalene diisocyanate, p-phenylene diisocyanate, m-phenylene diisocyanate, p-xylylene diisocyanate and m-xylylene diisocyanate, aliphatic diisocyanates such as ethylene diisocyanate, 2,2,4-trimethyl hexamethylene diisocyanate and 1,6-hexamethylene diisocyanate, and alicyclic diisocyanates such as 1,4-cyclohexane diisocyanate, 4,4'-dicyclohexyl methane diisocyanate, isophorone diisocyanate and norbornane diisocyanate. These may be used alone or as a mixture of two or more thereof.

As the isocyanate component, it is possible to use not only the above-described diisocyanate compounds but also multifunctional (trifunctional or more) polyisocyanates. As the multifunctional isocyanate compounds, a series of diisocyanate adduct compounds are commercially available as Desmodul-N (Bayer) and Duranate™ (Asahi Chemical Industry Co., Ltd.).

In the second invention, an aromatic isocyanate is preferably used at a content of 90 mol % or more, more preferably used at a 95 mol % or more and especially preferably used at a content of 100 mol %. An aromatic isocyanate is preferably diphenylmethane diisocyanate and more preferably 4,4'-diphenylmethane diisocyanate.

On the other hand, an isocyanate-terminated prepolymer used in the third invention is synthesized from an aliphatic and/or alicyclic isocyanate component and a high-molecular-weight polyol. The use of an isocyanate-terminated prepolymer renders physical properties of an obtained polyurethane resin foam excellent.

Examples of the aliphatic isocyanate include: ethylene diisocyanate, 2,2,4-trimethylhexamethylene diisocyanate, 1,6-hexamethylene diisocyanate and the like. The exemplified compounds may be used either alone or in a mixture of two or more kinds thereof.

Examples of the alicyclic isocyanate include: 1,4-cyclohexane diisocyanate, 4,4'-dicyclohexylmethane diisocyanate, isophorone diisocyanate, norbornane diisocyanate and the like. The exemplified compounds may be used either alone or in a mixture of two or more kinds thereof.

Polyfunctional, trifunctional or higher functional, polyisocyanate compounds can be used in addition to the examples of the aliphatic and/or alicyclic isocyanate.

Especially, as an isocyanate component, 4,4'-dicyclohexylmethane diisocyanate is preferably used alone.

On the other hand, a polyurethane resin used in the fourth invention is constituted of an isocyanate component, a polyol component (a high-molecular-weight polyol and a low-molecular-weight polyol) and a chain extender.

As isocyanate components, it is necessary to use a polymerized diisocyanate and an aromatic diisocyanate in combination.

A polymerized diisocyanate in the fourth invention is a modified polymerized isocyanate obtained by addition of three or more diisocyanate to one another or a mixture of modified polymerized isocyanates. Examples of the modified isocyanate include: 1) trimethylolpropane adduct type, 2) a biuret type, 3) an isocyanurate type and the like, among which especially preferable is of an isocyanurate type. In a case of a mixture, it is necessary to contain a modified isocyanate described above at a content of 50 wt % or more and preferably at a content of 60 wt % or more. Moreover, in a case of a mixture, trimerized diisocyanate is preferably contained at a content of 25 wt % or more and more preferable contained at a content of 35 wt % or more. No specific limitation is placed on a diisocyanate and any of known compounds in the field of a polyurethane can be used, examples of which include those described above.

In the fourth invention, as a diisocyante constituting a polmerized diisocyanate, an aliphatic diisocyanate is preferably used and 1,6-hexamethylene diisocyanate is especially preferably used. A plymerized diisocyanate may be of a modified type such as of urethane modified type, an allophanate modified type or a biuret modified type.

In the fourth invention, an aromatic diisocyanate is preferably toluene diisocyanate.

As the high-molecular-weight polyol, a compound known in the field of polyurethane can be used without particular limitation. The high-molecular-weight polyol includes, for example, polyether polyols represented by polytetramethylene ether glycol and polyethylene glycol, polyester polyols represented by polybutylene adipate, polyester polycarbonate polyols exemplified by reaction products of polyester glycols such as polycaprolactone polyol and polycaprolactone with alkylene carbonate, polyester polycarbonate polyols obtained by reacting ethylene carbonate with a multivalent alcohol and reacting the resulting reaction mixture with an organic dicarboxylic acid, and polycarbonate polyols obtained by ester exchange reaction of a polyhydroxyl compound with aryl carbonate. These may be used singly or as a mixture of two or more thereof. It is especially preferable to use polytetramethylene ether glycol.

No limitation is imposed on a number-average molecular weight of a high-molecular-weight polyol but it is preferably in the range of from 500 to 5000, more preferably in the range of from 500 to 2000 and especially preferably in the range of from 500 to 1500 from the viewpoint of an elastic characteristic of an obtained polyurethane resin. If a number-average molecular weight thereof is less than 500, a polyurethane resin obtained by using the polyol does not have a sufficient elastic characteristic and easy to be fragile, and a polishing pad made from the polyurethane resin is excessively hard, which sometimes causes scratches to be generated on a surface of an object to be polished. Moreover, since a polishing pad is easy to be worn away, it is unpreferable from the viewpoint of a life of a polishing pad. On the other hand, if a number-average molecular weight thereof exceeds 5000, a polishing pad made from a polyurethane resin obtained from such a polyol is unpreferably soft to thereby disable a sufficiently satisfiable planarity to be earned.

Examples of the low-molecular-weight polyol that can be used together with a high-molecular-weight polyol described above include: ethylene glycol, 1,2-propylene glycol, 1,3-propylene glycol, 1,2-butanediol, 1,3-butanediol, 1,4-butanediol, 2,3-butanediol, 1,6-hexanediol, neopentyl glycol, 1,4-cyclohexanedimethanol, 3-methyl-1,5-pentanediol, diethylene glycol, triethyleneglycol, 1,4-bis(2-hydroxyethoxy)benzene, trimethylolpropane, glycerin, 1,2,6-hexanetriol, pentaerythritol, tetramethylolcyclohexane, methyl glucoside, sorbitol, mannitol, dulcitol, sucrose, 2,2,6,6-tetrakis(hydroxymethyl)cyclohexanol, diethanolamine, N-methyldiethanolamine, triethanolamine and the like. Other examples that can be used together with the high-molecular-weight polyol also include: low-molecular-weight polyamine such as ethylenediamine, tolylenediamine, diphenylmethanediamine, diethylenetriamine and the like. Still other examples that can be used together with the high-molecular-weight polyol also include: alcoholamines such as monoethanolamine, 2-(2-aminoethylamino)ethanol, monopropanolamine and the like. The low-molecular-weight polyols and the low-molecular-weight polyamines may be used either alone or in combination of two or more kinds. A mixing quantity of each of a low-molecular-weight polyol and a low-molecular-weight polyamine is not specifically limited and properly determined so as to match characteristics required for a manufactured polishing pad (a polishing layer) but is preferably in the range of from 20 to 70 mol % relative to a total polyol component.

An isocyanate-terminated prepolymer is produced by heat-reacting a polyol component described above with an isocyanate component at an equivalent ratio of an isocyanate group (NCO) to an active hydrogen (H*) (NCO/H*) in the range of from 1.2 to 5.0 and preferably in the range of from 1.6 to 2.6. If an equivalent ratio thereof is less than 1.2, a prepolymer during synthesis thereof tends to be polymerized and thereby solidified and gelled. On the other hand, if an equivalent ratio thereof exceeds 5.0, a great quantity of unreacted isocyanate remains; therefore, a reaction with a chain extender is accelerated, leading to a tendency that a moldability of a polyurethane resin foam is degraded.

In the first invention, as a chain extender, an aromatic polyamine with a melting point of 70° C. or lower is used. Examples of such an aromatic polyamine include: 3,5-bis(methylthio)-2,4-toluenediamine, 3,5-bis(methylthio)-2,6-toluenediamine, 3,5-diethyl-2,4-toluenediamine, 3,5-diethyl-2,6-toluenediamine, N,N'-di-sec-butyl-4,4'-diaminodiphenylmethane, 3,3'-diethyl-4,4'-diaminodiphenylmethane, m-xylylenediamine, N,N'-di-sec-butyl-p-phenylenediamine, m-phenylenediamine, p-xylylenediamine, and a polyalkylene oxide-di-p-aminobenzoate expressed by the general formula (1). It is especially preferable to use polytetramethylene oxide-di-p-aminobenzoate with a polymerization degree n in the range of from 2 to 5. The aromatic polyamines may be used either alone or in combination of two or more kinds.

It is preferable to use a low-molecular-weight polyol and/or a low-molecular-weight polyamine, both described above, may be used together with a chain extender described above when necessary. In a case where the compounds are used in combination, a chain extender is preferably used at a content of 80 mol % or more and more preferably used at a content of 90 mol % or more. If a content of a chain extender is less than 80 mol %, a tendency arises that a cell diameter increases, a cell diameter is easy to fluctuate and a planarization characteristic of a polishing pad is deteriorated.

A ratio of a prepolymer to a chain extender can be altered in various ways according to molecular weights thereof and a desired physical property of a polishing pad to be manufactured. In order to obtain a polishing pad with a desired polishing characteristics, the number of isocyanate groups of a prepolymer relative to the number of functional groups of a chain extender is preferably in the range of from 0.95 to 1.20 and more preferably in the range of from 0.99 to 1.15.

The second invention, as a chain extender, uses an EO adduct and/or a PO adduct of at least one kind of an aromatic diol selected from the group consisting of hydroquinone, resorcin, p-xylylene glycol and bisphenol A.

An additive quantity of an EO adduct and/or a PO adduct is not specifically limited but is preferable in the range of from 2 to 4 mol relative to 1 mol of an aromatic diol. If additive quantities of an EO adduct and/or a PO adduct falls outside the range, a polyurethane resin foam is soft and a tendency arises that it is difficult to obtain a satisfiable planarity.

A ratio of a prepolymer to an aromatic diol EO/PO adduct can be altered in various ways according to molecular weights thereof and a desired physical property of a polishing pad to be manufactured. In order to obtain a polishing pad with desired polishing characteristics, a ratio of the number of isocyanate groups of a prepolymer relative to the number of functional groups of an aromatic diol EO/PO adduct is preferably in the range of from 0.95 to 1.20 and more preferably in the range of from 0.99 to 1.15.

As a chain extender, a low-molecular-weight polyol and/or a low-molecular-weight polyamine may be used together with an aromatic diol EO/PO adduct. In a case where the compounds are used in combination, it is preferable to use an aromatic diol EO/PO adduct at a content of 80 mol % or more and more preferably at a content of 90 mol %. If a content of an aromatic diol EO/PO adduct is less than 80 mol %, a tendency arises that a diameter of a cell increases, a diameter of a cell is easy to fluctuate and a planarization characteristic of a polishing pad is deteriorated.

The third invention, as a chain extender, uses at least one kind of a halogen free aromatic amine selected from the group consisting of compounds expressed by the general formulae (2) to (4).

In the general formula (2), $R^1$ to $R^3$, each independently of the others, are an alkyl group having 1 to 3 carbon atoms or a methylthio group and preferably an alkyl group having 1 to 2 carbon atoms or a methylthio group. Among halogen free aromatic amines expressed by the general formula (2), especially preferably used are 3,5-diethyl-2,4-toluenediamine, 3,5-diethyl-2,6-toluenediamine, 3,5-bis(methylthio)-2,4-toluenediamine and 3,5-bis(methylthio)-2,6-toluenediamine.

In the general formula (3), $R^4$ to $R^7$, each independently of the others, H or an alkyl group having 1 to 4 carbon atoms and preferably an alkyl group having 1 or 2 carbon atoms. Among halogen free aromatic amines expressed by the general formula (3), especially preferably used are 4,4'-diaminodiphenylmethane, 4,4'-diamino-3,3'-diethyl-5,5'-dimethyldiphenylmethane, 4,4'-diamino-3,3',5,5'-tetraethyldiphenylmethane, 4,4'-diamino-3,3'-diisopropyl-5,5'-dimethyldiphenylmethane and 4,4'-diamino-3,3',5,5'-tetraisopropyldiphenylmethane.

In the general formula (4), m is an integer from 2 to 4 and preferably an integer 3 or 4 and n is an integer from 1 to 20 and preferably an integer from 1 to 5. Among halogen free aromatic amines expressed by the general formula (4), especially preferably used are trimethylene glycol-di-p-aminobenzoate and polytetramethylene oxide-di-p-aminobenzoate with a polymerization degree n in the range of from 1 to 5.

It is preferable to use a low-molecular-weight polyol and/or a low-molecular-weight polyamine, both described above, may be used together with a halogen free aromatic amine as a chain extender described above when necessary. In a case where the compounds are used in combination, a halogen free aromatic amine is preferably used at a content of 80 mol % or more and more preferably used at a content of 90 mol %. If a content of a halogen free aromatic amine is less than 80 mol %, a tendency arises that a cell diameter increases, a cell diameter is easy to fluctuate and a planarization characteristic of a polishing pad is deteriorated.

A ratio of a prepolymer to a chain extender can be altered in various ways according to molecular weights thereof and a desired physical property of a polishing pad to be manufactured. In order to obtain a polishing pad with desired polishing characteristics, the number of isocyanate groups of a prepolymer relative to the number of functional groups of a chain extender is preferably in the range of from 0.95 to 1.20 and more preferably in the range of from 0.99 to 1.15.

In the fourth invention, in a case where a polyurethane resin foam is produced by means of a prepolymer method, a chain extender is used in curing of a prepolymer. A chain extender is an organic compound having at least two active hydrogen groups and examples of the active hydrogen group include: a hydroxyl group, a primary or secondary amino group, a thiol group (SH) and the like. Concrete examples of the chain extender include: polyamines such as 4,4'-methylenebis(o-chloroaniline)(MOCA), 2,6-dichloro-p-phenylenediamine, 4,4'-methylenebis(2,3-dichloroaniline), 3,5-bis(methylthio)-2,4-toluenediamine, 3,5-bis(methylthio)-2,6-toluenediamine, 3,5-diethyltoluene-2,4-diamine, 3,5-diethyltoluene-2,6-diamine, trimethylene glycol-di-p-aminobenzoate, polytetramethylene oxide-di-p-aminobenzoate, 4,4'-diamino-3,3',5,5'-tetraethyldiphenylmethane, 4,4'-diamino-3,3'-diisopropyl-5,5'-dimethyldiphenylmethane, 4,4'-diamino-3,3',5,5'-tetraisopropyldiphenylmethane, 1,2-bis(2-aminophenylthio)ethane, 4,4'-diamino-3,3'-diethyl-5,5'-dimethyldiphenylmethane, N,N'-di-sec-butyl-4,4'-diaminophenylmethane, 3,3'-diethyl-4,4'-diaminodiphenylmethane, m-xylylenediamine, N,N'-di-sec-butyl-p-phenylenediamine, m-phenylenediamine and p-xylylenediamine; low-molecular-weight polyol component; and a low-molecular-weight polyamine component. The chain extenders described above may be used either alone or in mixture of two kinds or more. Especially preferably used are halogen free aromatic diamines such as 3,5-bis(methylthio)-2,4-toluenediamine and 3,5-bis(methylthio)-2,6-toluenediamine.

A ratio between an isocyanate component, a polyol component and a chain extender in the fourth invention can be altered in various ways according to molecular weights thereof, desired physical properties of a polishing pad and the like. In order to obtain a polishing pad with desired polishing characteristics, a ratio of the number of isocyanate groups in an isocyanate component relative to a total number of active hydrogen groups (hydroxyl groups+amino groups) in a polyol component and a chain extender is preferably in the range of from 0.80 to 1.20 and more preferably in the range of from 0.99 to 1.15. If the number of isocyanate groups falls outside the range, a tendency arises that insufficient curing occurs, thereby neither a specific gravity nor a hardness, both are desired, is obtained and polishing characteristics are deteriorated.

A polyurethane resin foam of the first invention is produced by means of a melting method giving consideration to a necessity for cells to be included into a polyurethane resin, a cost, a working environment and the like. Then, a silicon-based surfactant containing a silicon resin, which is a copolymer of polyalkylsiloxane and polyalkyl ether, is used to thereby produce a polyurethane resin foam using a mechanical foaming method. Exemplified as such silicone-based surfactants is SH-192 (manufactured by Toray Dow Corning Silicone Co., Ltd.) as a preferable compound.

Various additives may be mixed; such as a stabilizer including an antioxidant, a lubricant, a pigment, a filler, an antistatic agent and others. They can be mixed into any of the first component and the second component, but preferably added into both components while both components are mixed.

Description will be given of an example of a method of producing a polyurethane resin foam of a fine cell type constituting a polishing pad (a polishing layer) below. A method of manufacturing such a polyurethane resin foam has the following steps:
1) a foaming step of preparing a cell dispersion liquid of an isocyanate-terminated prepolymer,
wherein a silicone-based surfactant is added into an isocyanate-terminated prepolymer, which is agitated in the presence of a non-reactive gas to thereby disperse the non-reactive gas into the prepolymer as fine cells and obtain a cell dispersion liquid. In a case where the prepolymer is solid at an ordinary temperature, the prepolymer is preheated to a proper temperature and used in a molten state.
2) a curing agent (chain extender) mixing step,
wherein a chain extender is added into the cell dispersion liquid, which is agitated to thereby obtain a foaming reaction liquid.
3) a casting step,
wherein the forming reaction liquid is cast into a mold.
4) a curing step,
wherein the foaming reaction liquid having been cast into the mold is heated and reaction-cured.

The non-reactive gas used for forming fine cells is preferably not combustible, and is specifically nitrogen, oxygen, a carbon dioxide gas, a rare gas such as helium and argon, and a mixed gas thereof, and the air dried to remove water is most preferable in respect of cost.

As a stirrer for dispersing the silicone-based surfactant-containing first component to form fine cells with the non-reactive gas, known stirrers can be used without particular limitation, and examples thereof include a homogenizer, a dissolver, a twin-screw planetary mixer etc. The shape of a stirring blade of the stirrer is not particularly limited either, but a whipper-type stirring blade is preferably used to form fine cells.

In a preferable mode, different stirrers are used in stirring for forming a cell dispersion liquid in the stirring step and in stirring for mixing an added chain extender in the mixing step, respectively. In particular, stirring in the mixing step may not be stirring for forming cells, and a stirrer not generating large cells is preferably used. Such a stirrer is preferably a planetary mixer. The same stirrer may be used in the stirring step and the mixing step, and stirring conditions such as revolution rate of the stirring blade are preferably regulated as necessary.

In the method of producing the polyurethane foam with fine cells, heating and post-curing of the foam obtained after casting and reacting the forming reaction liquid in a mold until the dispersion lost fluidity are effective in improving the physical properties of the foam, and are extremely preferable. The forming reaction liquid may be cast in a mold and immediately post-cured in a heating oven, and even under such conditions, heat is not immediately conducted to the reactive components, and thus the diameters of cells are not increased. The curing reaction is conducted preferably at normal pressures to stabilize the shape of cells.

In the production of the polyurethane foam, a known catalyst promoting polyurethane reaction, such as tertiary amine-based catalysts, may be used. The type and amount of the catalyst added are determined in consideration of flow time in casting in a predetermined mold after the mixing step.

Production of the polyurethane foam may be in a batch system where each component is weighed out, introduced into a vessel and mixed or in a continuous production system where each component and a non-reactive gas are continuously supplied to, and stirred in, a stirring apparatus and the resulting forming reaction liquid is transferred to produce molded articles.

A manufacturing method of a polishing pad of the first invention may be performed in ways: in one of which a prepolymer which is a raw material from which a polishing pad (a polishing layer) is made is put into a reaction vessel, thereafter a chain extender is mixed into the prepolymer, the mixture is agitated, thereafter the mixture is cast into a mold with a predetermined size to thereby prepare a block and the block is sliced with a slicer like a planer or a band saw; and in another of which in the step of casting into the mold, a thin sheet may be directly produced. Besides, a still another way may be adopted in which a resin of raw material is melted, the melt is extruded through a T die to thereby mold a polyurethane resin foam directly in the shape of a sheet.

On the other hand, a polyurethane resin foam of the second to fourth inventions can be produced by applying a melting method, a solution method or a known urethanization technique, among which preferable is a melting method, consideration being given to a cost, a working environment and the like.

Manufacture of a polyurethane resin foam of the second and third inventions is to mix the first component containing an isocyanate-terminated prepolymer into the second component containing a chain extender to thereby obtain the reaction product by curing.

Manufacture of a polyurethane resin foam of the fourth invention is enabled by means of either a prepolymer method or a one shot method, of which preferable is a prepolymer method in which an isocyanate-terminated prepolymer is synthesized from an isocyanate component and a polyol component in advance, with which a chain extender is reacted since physical properties of an obtained polyurethane resin is excellent. Note that an isocyanate-terminated prepolymer with a molecular weight of the order in the range of from 800 to 5000 is preferable because of excellency in workability and physical properties. Manufacture of the polyurethane resin foam is to mix the first component containing an isocyanate group containing compound and the second component containing an active hydrogen group containing compound to thereby cure the reaction product. In the prepolymer method, an isocyanate-terminated prepolymer serves as an isocyanate group containing compound and a chain extender serves as an active hydrogen group containing compound. In the one shot method, an isocyanate component serves as an isocyanate group containing compound, and a chain extender and a polyol component combined serves as an active hydrogen containing compound.

Manufacturing methods of a polyurethane resin foam include: a method in which hollow beads are added, a mechanically foaming method, a chemically forming method and the like.

Among the manufacturing methods, preferable is the mechanically foaming method using a silicone-based surfactant containing a silicon resin, which is a copolymer of a polyalkylsiloxane and a polyalkyl ether. A silicon resin described above is preferably in the range of from 1000 to 6000 in weight-average molecular weight and a ratio of ethylene oxide/propylene oxide in a molecule thereof (in molar ratio) is preferably in the range of from 70/30 to 100/0. The silicone resin has a siloxane skeleton with a hydroxyl group or an alcoxyl group at the terminal of a side chain thereof, of which preferable is the structure with a hydroxyl group at the terminal of a side chain thereof. A hydroxyl group at the terminal of a side chain of the siloxane skeleton increases compatibility thereof with a polyurethane resin, which enables a polyurethane resin foam with a more uniform, fine cell structure to be obtained. Examples of such a silicone-based surfactant include: SH-193 (manufactured by Toray Dow Corning Silicone Co., Ltd.), L-5340 (manufactured by Nihonunica Corporation) and the like. A silicon-based surfactant may contain a silicon resin with a hydroxyl group at the terminal of a side chain and a silicone resin with an alcoxy group at the terminal of a side chain.

In the first to third inventions, an average cell diameter of a polyurethane resin foam is preferably 70 µm or less and more preferably in the range of from 30 to 60 µm. If an average cell diameter exceeds 70 µm, a tendency arises that a planarity of an object to be polished after polishing is reduced.

In the fourth invention, an average cell diameter of a polyurethane resin foam is preferably in the range of from 30 to 80 µm and more preferably in the range of from 30 to 60 µm. If an average cell diameter falls outside the range, a tendency arises that a polishing speed is decreased and a planarity of an object to be polished (a wafer) after polishing is reduced.

Fluctuations in cell diameter of a polyurethane resin foam is preferably 8.5 or less and more preferably 8 or less in terms of a standard deviation. If a standard deviation exceeds 8.5, a planarization characteristic is deteriorated and a polishing rate gets unstabilized.

A specific gravity of a polyurethane resin foam is preferably in the range of from 0.5 to 1.0. If a specific gravity thereof is less than 0.5, a tendency arises that a surface strength of a polishing layer is lowered and a planarity of a polished object is reduced. On the other hand, if a specific gravity thereof more than 1.0, a tendency arises that the number of cells on the surface of a polishing layer gets smaller and a polishing speed is decreased, though with a good planarity ensured.

A hardness of a polyurethane resin foam is preferably in the range of from 45 to 65 degrees as measured with an Asker D hardness meter. If an Asker D hardness is less than 45 degrees, a planarity of a polished object is reduced, while on the other hand, if an Asker D hardness is larger than 65 degrees, a tendency arises that a uniformity of a polished object is degraded, though with a good planarity ensured.

A polishing pad (polishing layer) of the invention is preferably provided with a depression and a protrusion structure for holding and renewing a slurry. Though in a case where the polishing layer is formed with a fine foam, many openings are on a polishing surface thereof which works so as to hold the slurry, a depression and protrusion structure are preferably provided on the surface of the polishing side thereof in order to achieve more of holdability and renewal of the slurry or in order to prevent induction of dechuck error, breakage of a wafer or decrease in polishing efficiency. The shape of the depression and protrusion structure is not particularly limited insofar as slurry can be retained and renewed, and examples include latticed grooves, concentric circle-shaped grooves, through-holes, non-through-holes, polygonal prism, cylinder, spiral grooves, eccentric grooves, radial grooves, and a combination of these grooves. The groove pitch, groove width, groove thickness etc. are not particularly limited either, and are suitably determined to form grooves. These depression and protrusion structure are generally those having regularity, but the groove pitch, groove width, groove depth etc. can also be changed at each certain region to make retention and renewal of slurry desirable.

The method of forming the depression and protrusion structure is not particularly limited, and for example, formation by mechanical cutting with a jig such as a bite of predetermined size, formation by casting and curing resin in a mold having a specific surface shape, formation by pressing resin with a pressing plate having a specific surface shape, formation by photolithography, formation by a printing means, and formation by a laser light using a $CO_2$ gas laser or the like.

No specific limitation is placed on a thickness of a polishing layer, but a thickness thereof is about 0.8 to 4 mm, preferably 1.5 to 2.5 mm. The method of preparing the polishing layer of this thickness includes a method wherein a block of the fine-cell foam is cut in predetermined thickness by a slicer in a bandsaw system or a planing system, a method that involves casting resin into a mold having a cavity of predetermined thickness and curing the resin, a method of using coating techniques and sheet molding techniques, etc.

The scatter of the thickness of the polishing layer is preferably 100 μm or less. When the scatter of the thickness is higher than 100 μm, large undulation is caused to generate portions different in a contacting state with an object of polishing, thus adversely influencing polishing characteristics. To solve the scatter of the thickness of the polishing layer, the surface of the polishing layer is dressed generally in an initial stage of polishing by a dresser having abrasive grains of diamond deposited or fused thereon, but the polishing layer outside of the range described above requires a longer dressing time to reduce the efficiency of production.

As a method of suppressing the scatter of thickness, there is also a method of buffing the surface of the polishing layer having a predetermined thickness. Buffing is conducted preferably stepwise by using polishing sheets different in grain size.

A polishing pad of the invention may also be a laminate of a polishing layer and a cushion sheet adhered to each other.

The cushion sheet (cushion layer) compensates for characteristics of the polishing layer. The cushion layer is required for satisfying both planarity and uniformity which are in a tradeoff relationship in CMP. Planarity refers to flatness of a pattern region upon polishing an object of polishing having fine unevenness generated upon pattern formation, and uniformity refers to the uniformity of the whole of an object of polishing. Planarity is improved by the characteristics of the polishing layer, while uniformity is improved by the characteristics of the cushion layer. The cushion layer used in the polishing pad of the present invention is preferably softer than the polishing layer.

The material forming the cushion layer is not particularly limited, and examples of such material include a nonwoven fabric such as a polyester nonwoven fabric, a nylon nonwoven fabric or an acrylic nonwoven fabric, a nonwoven fabric impregnated with resin such as a polyester nonwoven fabric impregnated with polyurethane, polymer resin foam such as polyurethane foam and polyethylene foam, rubber resin such as butadiene rubber and isoprene rubber, and photosensitive resin.

Means for adhering the polishing layer to the cushion layer include: for example, a method in which a double sided tape is sandwiched between the polishing layer and the cushion layer, followed by pressing.

The double sided tape is of a common construction in which adhesive layers are provided on both surfaces of a substrate such as a nonwoven fabric or a film. It is preferable to use a film as a substrate with consideration given to prevention of permeation of a slurry into a cushion sheet. A composition of an adhesive layer is, for example, of a rubber-based adhesive, an acrylic-based adhesive or the like. An acrylic-based adhesive is preferable because of less of a content of metal ions, to which consideration is given. Since a polishing layer and a cushion sheet is sometimes different in composition from each other, different compositions are adopted in respective adhesive layers of double sided tape to thereby also enable adhesive forces of the respective adhesive layers to be adjusted to proper values.

A polishing pad of the invention may be provided with a double sided tape on the surface of the pad adhered to a platen. As the double sided tape, a tape of a common construction can be used in which adhesive layers are, as described above, provided on both surfaces of a substrate. As the substrate, for example, a nonwoven fabric or a film is used. Preferably used is a film as a substrate since separation from the platen is necessary after the use of a polishing pad. As a composition of an adhesive layer, for example, a rubber-based adhesive or an acrylic-based adhesive is exemplified. Preferable is an acrylic-based adhesive because of less of metal ions in content to which consideration is given.

A semiconductor device is fabricated after operation in a step of polishing a surface of a semiconductor wafer with a polishing pad. The term, a semiconductor wafer, generally means a silicon wafer on which a wiring metal and an oxide layer are stacked. No specific limitation is imposed on a polishing method of a semiconductor wafer or a polishing apparatus, and polishing is performed with a polishing apparatus equipped, as shown in FIG. 1, with a polishing platen 2 supporting a polishing pad (a polishing layer) 1, a polishing head 5 holding a semiconductor wafer 4, a backing material for applying a uniform pressure against the wafer and a supply mechanism of a polishing agent 3. The polishing pad 1 is mounted on the polishing platen 2 by adhering the pad to the platen with a double sided tape. The polishing platen 2 and the polishing head 5 are disposed so that the polishing pad 1 and the semiconductor wafer 4 supported or held by them oppositely face each other and provided with respective rotary shafts 6 and 7. A pressure mechanism for pressing the semiconductor wafer 4 to the polishing pad 1 is installed on the polishing head 5 side. During polishing, the semiconductor wafer 4 is polished by being pressed against the polishing pad 1 while the polishing platen 2 and the polishing head 5 are rotated and a slurry is fed. No specific limitation is placed on a flow rate of the slurry, a polishing load, a polishing platen rotation number and a wafer rotation number, which are properly adjusted.

Protrusions on the surface of the semiconductor wafer 4 are thereby removed and polished flatly. Thereafter, a semiconductor device is produced therefrom through dicing, bonding, packaging etc. The semiconductor device is used in an arithmetic processor, a memory etc.

EXAMPLES

Description will be given of the invention with examples, while the invention is not limited to description in the examples.

[Measurement and Evaluation Method]
(Measurement of Number-Average Molecular Weight)

A number-average molecular weight was measured by GPC (a Gel Permeation Chromatography) and a value as measured was converted in terms of standard polystylene molecular weight, and the apparatus and conditions in operation were as follows:

GPC apparatus was an apparatus manufactured by Shimadzu Corp., with Model Number of LC-10A.

Columns that were used in measurement were ones manufactured by Polymer Laboratories Co., in which three columns were in connection including (PL gel, 5 μm and 500 Å), (PL gel, 5 μm and 100 Å) and (PL gel, 5 μm and 50 Å).

A flow rate was 1.0 ml/min.
A concentration was 1.0 g/l.
An injection quantity was 40 μl.
A column temperature was 40° C.
An eluent was tetrahydrofuran.

(Measurement of Weight-Average Molecular Weight of Silicone-based Surfactant)

A weight-average molecular weight of a silicone-based surfactant was measured by GPC and a value as measured was converted in terms of a standard polypropylene glycol molecular weight, and the apparatus and conditions in operation were as follows:

GPC apparatus was an apparatus manufactured by Shimadzu Corp., with Model Number of LC-10A.

Columns that were used in measurement were PLMixE (manufactured by Polymer Laboratories Co.), in which were two columns were in connection.

A flow rate was 0.7 ml/min.
A concentration was 0.3 wt %.
An injection quantity was 40 μl.
A column temperature was 40° C.
An eluent was tetrahydrofuran.

(Measurement of EO/PO)

A molar ratio (EO/PO) between ethylene oxide (EO) and propylene oxide (PO) in a silicone resin, which is a copolymer of a polyalkylsiloxane and a polyether contained in a silicone-based surfactant, was measured by NMR. FT-NMR DPX400S (manufactured by BURKER CO.) was used as a measurement apparatus and a silicone-based surfactant was dissolved in chloroform to prepare a 2 wt % solution as a sample. Measurement conditions were such that an accumulated number of times of measurement was set to 64, a pulse angle was set to 30 degrees and a pulse wait time was set to 1.0 sec. EO/PO was calculated using the following equation.

$$EO/PO=[(P1-P2-P5)/4]/(P2/3),$$

wherein P1, P2 and P5 are determined by H in the following structure formula.

$P1$ is an integral of H (3.0 to 4.0 ppm) of —$OCH_2$— group and —OCH— group.

$P2$ is an integral of H (in the vicinity of 1.1 ppm) of C—$CH_3$ group.

$P5$ is an integral of H (in the vicinity of 0.45 ppm) of Si—$CH_2$- group as Si—X group.

(Measurement of Content of Polymerized Diisocyanate)

A content of polymerized diisocyanate was calculated from the number-average molecular weight as measured by GPC and converted in terms of a standard PPG molecular weight and a peak area ratio thereof, and the apparatus and conditions in operation were as follows:

GPC apparatus was an apparatus manufactured by Shimadzu Corp., with Model Number LC-10A.

Columns that were used in measurement were two columns in connection, manufactured by Polymer Laboratories Co. (PL gel, 3 μm and mix E).

A flow rate was 0.7 ml/min.
A concentration was 2.0 g/l.
An injection quantity was 40 μl.
A column temperature was 40° C.
An eluent was tetrahydrofuran.

(Measurement of Average Cell Diameter and Standard Deviation)

A manufactured polyurethane resin foam was sliced with a microtome cutter into measurement samples each with the thinnest possible thickness of 1 mm or less. A surface of a sample was photographed with a scanning electron microscope (manufactured by Hitachi Science System Co. with a model number of S-3500N) at a magnification of ×100. An effective circular diameter of each of all cells in an arbitrary area was measured with an image analyzing soft (manufactured by MITANI Corp. with a trade name WIN-ROOF) and an average cell diameter and a standard deviation were calculated from the measured values.

(Measurement of Specific Gravity)

Determined according to JIS Z8807-1976. A manufactured polyurethane resin foam cut out in the form of a strip of 4 cm×8.5 cm (thickness: arbitrary) was used as a sample for measurement of specific gravity and left for 16 hours in an environment of a temperature of 23±2° C. and a humidity of 50%±5%. Measurement was conducted by using a specific gravity hydrometer (manufactured by Sartorius Co., Ltd).

(Measurement of Hardness)

Measurement is conducted according to JIS K6253-1997. A manufactured polyurethane resin foam cut out in a size of 2 cm×2 cm (thickness: arbitrary) was used as a sample for measurement of hardness and left for 16 hours in an environment of a temperature of 23±2° C. and a humidity of

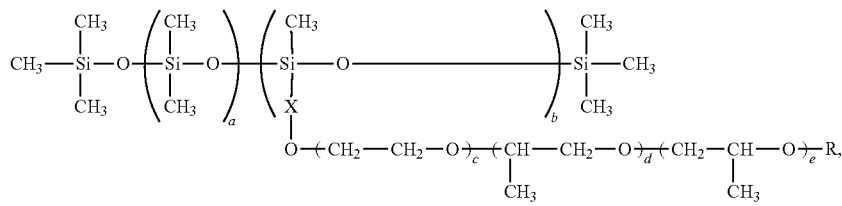

wherein in the formula, X is an alkylene group, R is H or an alykyl group. Note that an ethylene oxide group and a propylene oxide group may be either of a block structure or of a random structure.

50%±5%. At the time of measurement, samples were stuck on one another to a thickness of 6 mm or more. A hardness meter (Asker D hardness meter, manufactured by Kobunshi Keiki Co., Ltd.) was used to measure hardness.

(Evaluation of Polishing Characteristics)

The prepared polishing pad was used to evaluate polishing characteristics by using a polishing apparatus SPP600S (manufactured by Okamoto Machine Tool Works, Ltd.). An about 1 μm thermal-oxide film deposited on an 8-inch silicone wafer was polished by about 0.5 μm, and polishing rate was calculated from the time of this polishing. The thickness of the oxide film was measured by using an interference film thickness measuring instrument (manufactured by Otsuka Electronics Co., Ltd). During polishing, silica slurry (SS12 manufactured by Cabot) was added at a flow rate of 150 ml/min. Polishing loading was 350 g/cm$^2$, the number of revolutions of the polishing platen was 35 rpm, and the number of revolutions of the wafer was 30 rpm For evaluation of planarizing characteristics, a 0.5 μm thermal-oxide film was deposited on an 8-inch silicone wafer and subjected to predetermined patterning, and then a 1 μm oxide film of p-TEOS was deposited thereon, to prepare a wafer having a pattern with an initial difference in level of 0.5 μm. This wafer was polished under the above-described conditions, and after polishing, each difference in level was measured to evaluate planarizing characteristics.

For planarizing characteristics, two differences in level were measured. One difference is a local difference in level, which is a difference in level in a pattern having lines of 270 μm in width and spaces of 30 μm arranged alternately, and this difference in level after 1 minute was measured. The other difference is an abrasion loss, and in two patterns, that is, a pattern having lines of 270 μm in width and spaces of 30 μm arranged alternately and a pattern having lines of 30 μm in width and spaces of 270 μm arranged alternately, the abrasion loss of 270 μm spaces was measured when the difference in level of the top of the line in the two patterns became 2000 Å or less. A lower local difference in level is indicative of a higher speed of flattening unevenness of the oxide film generated depending on wafer pattern at a certain point in time. A lower abrasion of spaces is indicative of higher planarity with less abrasion of portions desired to be not shaved.

Figure 2:
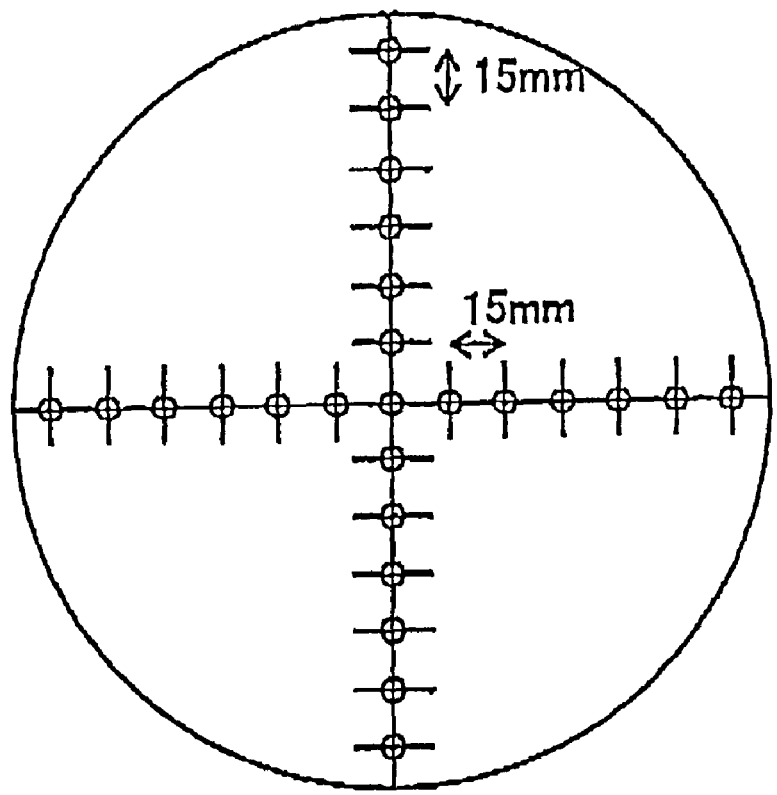
FIG. 2 is a schematic view showing 25 points for film thickness measurement on a wafer.

Evaluation of in-plane uniformity was calculated in a procedure in which an 8 inch silicon wafer on which a thermal oxide film was deposited to a thickness of 1 μm was polished in the conditions described above to a reduced thickness of 0.5 μm and the maximum polishing speed and the minimum polishing speed were obtained from film thickness values at specific 25 points on the wafer, as shown in FIG. 2, before and after polishing were measured and the values were substituted into the following equation. Note that a reduced value of in-plane uniformity means a higher uniformity on a wafer surface.

In-plane uniformity (%)={(the maximum polishing speed−the minimum polishing speed)/(the maximum polishing speed+the minimum polishing speed)}×100

(Measurement of Dressing Speed)

A surface of a manufactured polishing pad was uniformly dressed with a diamond dresser (manufactured by Asahi Diamond Co. with a trade name of M Type #100 in the shape of a circle with a diameter of 20 cm) while being rotated. A dresser load at this time was set to 450 g/cm$^2$, a polishing platen rotation number was set to 30 rpm, a dresser rotation number was set to 15 rpm and a dressing time was set to 100 min. A dressing speed was calculated from thickness values of the polishing pad as measured before and after dressing.

EXAMPLES OF THE FIRST INVENTION

Example 1

1229 parts by wt of toluene diisocyanate (a mixture of toluene 2,4-diisocyanate/toluene 2,6-diisocyanate=80/20), 272 parts by wt of 4,4'-dicyclohexylmethane diisocyanate, 1901 parts by wt of polytetramethylene ether glycol with a number-average molecular weight of 1018 and 198 parts by wt of diethylene glycol were put into a vessel to cause a reaction in the mixture at 70° C. for 4 hr to obtain an isocyanate-terminated prepolymer.

100 parts by wt of the prepolymer and 3 parts by wt of a silicone-based surfactant (manufactured by Toray Dow Corning Silicone Co. with a trade name of SH-192) were put into a polymerization vessel and mixed and the mixture was vacuum defoamed at an adjusted temperature of 80° C. Thereafter, the vacuum defoamed mixture was agitated with agitating blades at a rotation number thereof of 900 rpm vigorously for about 4 min so that cells were included into a reaction system. 21 parts by wt of ETACURE 300 (a mixture of 3,5-bis(methylthio)-2,6-toluenediamine and 3,5-bis(methylthio)-2,4-toluenediamine manufactured by Albemal Co., Ltd.) at a temperature of 70° C. adjusted in advance) was added into the reaction mixture. After the reaction mixture was agitated for about 1 min, it was cast into an open mold of a pan type (casting vessel). When the reaction mixture lost fluidity thereof, it was placed into an oven and post cured at 100° C. for 16 hr to obtain a polyurethane resin foam block.

The polyurethane resin foam block heated at about 80° C. was sliced with a slicer (manufactured by Amitech, Inc. with a model number of VGW-125) to obtain a polyurethane resin foam sheets. Then, a sheet was surface buffed to a thickness of 1.27 mm with a buffing machine (manufactured by Amitech, Inc.) to thereby obtain a sheet finished to a proper thickness precision. The buffed sheet was punched to form a circular hole with a diameter of 61 cm to obtain a circular sheet, and the circular sheet was grooved with a grooving machine (manufactured by Techno Co.) to form concentric circular grooves with a groove width of 0.25 mm, a groove pitch of 1.50 mm and a groove depth of 0.40 mm thereon to thus prepare a polishing sheet. A double sided tape (manufactured by Sekisui Chemical Co., Ltd. with a trade name of Double Tac Tape) was adhered onto a surface on the other side of the polishing sheet from the grooved surface with a laminator. A corona-treated cushion sheet (a polyethylene foam manufactured by TORAY INDUSTRIES, INC. with a trade name of Toray PEF and a thickness of 0.8 mm) was surface buffed and adhered onto the double sided tape with a laminator. A double sided tape was further adhered onto the other surface of the cushion sheet with a laminator to thereby manufacture a polishing pad.

Example 2

A polishing pad was manufactured in a similar way to that in Example 1 with the exception that in Example 1, 18 parts by wt of ETACURE 100 (a mixture of 3,5-diethyl-2,6-toluenediamine and 3,5-diethyl-2,4-toluenediamine manufactured by Albemal Co., Ltd.) at a temperature of 70° C. adjusted in advance was used instead of ETACURE 300 at a temperature of 70° C. adjusted in advance.

Example 3

A polishing pad was manufactured in a similar way to that in Example 1 with the exception that in Example 1, 31 parts by wt of N,N'-di-sec-butyl-4,4'-diaminodiphenylmethane (manufactured by Dorf Ketal Chemicals Co. with a trade name of Unilink 4200).

Example 4

A polishing pad was manufactured in a similar way to that in Example 1 with the exception that in Example 1, 25 parts by wt of 3,3'-diethyl-4,4'-diaminodiphenylmethane (manufactured by NIPPON KAYAKU CO., LTD. with a trade name of Kayahard A-A) at a temperature of 70° C. adjusted in advance was used instead of ETACURE 300 at a temperature of 70° C. adjusted in advance.

Example 5

A polishing pad was manufactured in a similar way to that in Example 1 with the exception that in Example 1, 22 parts by wt of N,N'-di-sec-butyl-p-phenylenediamine (SUMITOMO CHEMICAL CO., LTD with a trade name of Sumirizer BPA) was used instead of ETACURE 300 at a temperature of 70° C. adjusted in advance.

Example 6

A polishing pad was manufactured in a similar way to that in Example 1 with the exception that in Example 1, 48 parts by wt of polytetramethylene oxide-di-p-aminobenzoate (manufactured by Ihara Chemical Industries Co., Ltd. with a trade name of Elasmer 250P, and an average polymerization degree n of 3.2) at a temperature of 70° C. adjusted in advance was used instead of ETACURE 300 at a temperature of 70° C. adjusted in advance.

Comparative Example 1

A polishing pad was manufactured in a similar way to that in Example 1 with the exception that in Example 1, 26 parts by wt of 4,4'-methylenebis(o-chloroaniline) in a molten state at a temperature of 120° C. was used instead of ETACURE 300 at a temperature of 70° C. adjusted in advance.

The polishing pads obtained in the examples and the comparative example each were subjected to a polishing test to thereby evaluate polishing characteristics. In Table 1, there are shown results of the evaluation.

TABLE 1

|  | Polishing sheet | | | | Polishing pad | | | |
| --- | --- | --- | --- | --- | --- | --- | --- |
|  | Specific gravity | D hardness (degree) | Average cell diameter (μm) | Standard deviation | Local level difference (Å) | Wear (Å) | Polishing speed (Å/min) | Dressing speed (μm/min) |
| Example 1 | 0.84 | 54 | 40.6 | 7.56 | 25 | 2700 | 2250 | 4.8 |
| Example 2 | 0.85 | 53 | 41.3 | 7.76 | 25 | 2800 | 2130 | 4.6 |
| Example 3 | 0.85 | 52 | 42.7 | 7.61 | 25 | 2800 | 2150 | 4.7 |
| Example 4 | 0.84 | 52 | 43.5 | 7.85 | 25 | 2900 | 2200 | 4.5 |
| Example 5 | 0.85 | 53 | 41.5 | 7.66 | 25 | 2800 | 2190 | 4.6 |
| Example 6 | 0.85 | 53 | 43.2 | 7.79 | 25 | 2900 | 2120 | 4.7 |
| Comparative example 1 | 0.85 | 53 | 55.0 | 8.95 | 30 | 3000 | 2010 | 4.0 |

It was found from the results shown in Table 1 that an aromatic polyamine with a melting point of 70° C. or lower is used as a chain extender to thereby enable a polishing pad with very uniform, fine cells therein to be obtained. It is further found that the polishing pad is more excellent in a planarization characteristic than a conventional pad.

EXAMPLES OF THE SECOND INVENTION

Example 1

578 parts by wt of 4,4'-diphenylmethane diisocyanate (hereinafter referred to as MDI for short), 378 parts by wt of polytetramethylene ether glycol with a number-average molecular weight of 653 (hereinafter referred to as PTMG-650 for short) and 44 parts by wt of propylene glycol (hereinafter referred to as PG for short) were put into a vessel to cause a reaction in the mixture at 80° C. for 2 hr to obtain an isocyanate-terminated prepolymer (A). 100 parts by wt of the prepolymer (A) and 3 parts by wt of a silicone-based surfactant (manufactured by Nihonunica Corporation with a trade name of L-5340) were put into a polymerization vessel and mixed and the mixture was vacuum defoamed at an adjusted temperature of 80° C. Thereafter, the vacuum defoamed mixture was agitated with agitating blades at a rotation number thereof of 900 rpm vigorously for about 4 min so that cells were included into a reaction system. 21 parts by wt of 1,4-bis(β-hydroxyethoxy)benzene (manufactured by Mitsui Chemical fine Co., hereinafter referred to as BHEB for short) melted at a temperature of 140° C. in advance was added into the reaction mixture. After the reaction mixture was agitated for about 1 min, it was cast into an open mold of a pan type (casting mold). When the reaction mixture lost fluidity thereof, it was placed into an oven and post cured at 100° C. for 16 hr to obtain a polyurethane resin foam block.

The polyurethane resin foam block was sliced with a slicer of a band saw type to obtain a polyurethane resin foam sheets. Then, a sheet was surface buffed to a thickness of 1.27 mm with a buffing machine (manufactured by Amitech, Inc.) to thereby obtain a sheet finished to a proper thickness precision. The buffed sheet was punched to form a circular hole with a diameter of 61 cm to obtain a circular sheet, and the circular sheet was grooved with a grooving machine to form concentric circular grooves with a groove width of 0.25 mm, a groove pitch of 1.50 mm and a groove depth of 0.40 mm thereon to thus prepare a polishing sheet. A double sided tape (manufactured by Sekisui Chemical Co., Ltd. with a trade name of Double Tac Tape) was adhered onto a surface on the other side of the polishing sheet from the grooved surface with a laminator. A corona-treated cushion sheet (a polyethylene foam manufactured by TORAY INDUSTRIES, INC. with a trade name of Toray PEF and a thickness of 0.8 mm) was surface buffed and adhered onto the double sided tape with a laminator. A double sided tape was further adhered onto the other surface of the cushion sheet with a laminator.

Example 2

A polishing pad was manufactured in a similar way to that in Example 1 with the exception that in Example 1, 21 parts by wt of a EO 2 mol adduct of resorcin (manufactured by INDSPEC Chemical Co., Ltd. with a trade name of HER) at a temperature of 100° C. was used instead of BHEB in a molten state at a temperature of 140° C.

Example 3

A polishing pad was manufactured in a similar way to that in Example 1 with the exception that in Example 1, 35 parts by wt of an EO adduct of bisphenol A (manufactured by Nippon Nyukazai Co., Ltd. With a trade name of BA-2 glycol) at a temperature of 140° C. was used instead of BHEB in a molten state at a temperature of 140° C.

Example 4

673 parts by wt of MDI, 293 parts by wt of PTMG-650 and 34 parts by wt of PG were put into a vessel and a reaction was caused in the mixture at 80° C. for 2 hr to obtain an isocyanate-terminated prepolymer (B).

A polishing pad was manufactured in a similar way to that in Example 1 with the exception that in Example 1, 100 parts by wt of an isocyanate-terminated prepolymer (B) was used instead of 100 parts by wt of an isocyanate-terminated prepolymer (A) and changed from 21 parts by wt of BHEB to 32 parts by wt of BHEB.

Example 5

569 parts by wt of MDI, 371 parts by wt of PTMG-650 and 60 parts by wt of diethylene glycol (hereinafter referred to DEG for short) were put into a vessel and a reaction was caused in the mixture at 80° C. for 2 hr to obtain an isocyanate-terminated prepolymer (C).

A polishing pad was manufactured in a similar way to that in Example 1 with the exception that in Example 1, 100 parts by wt of an isocyanate-terminated prepolymer (C) was used instead of 100 parts by wt of an isocyanate-terminated prepolymer (A).

Example 6

488 parts by wt of toluene diisocyanate (a mixture of toluene 2,4-diisocyanate/toluene 2,6-diisocyanate=80/20, hereinafter referred to as TDI-80 for short), 458 parts by wt of PTMG-650 and 53 parts by wt of PG were put into a vessel and a reaction was caused in the mixture at 80° C. for 2 hr to obtain an isocyanate-terminated pre polymer (D).

A polishing pad was manufactured in a similar way to that in Example 1 with the exception that in Example 1, 100 parts by wt of an isocyanate-terminated prepolymer (D) was used instead of 100 parts by wt of an isocyanate-terminated prepolymer (A) and changed from 21 parts by wt of BHEB to 25 parts by wt of BHEB.

Comparative Example 1

341 parts by wt of TDI-80 (87 mol % relative to a total isocyanate component), 76 parts by wt of 4,4'-dicyclohexylmethane diisocyanate, 528 parts by wt of polytetramethylene ether glycol with a number-average molecular weight of 1018 and 55 parts by wt of DEG were put into a vessel to cause a reaction in the mixture at 80° C. for 2 hr to obtain an isocyanate-terminated prepolymer (E).

100 parts by wt of the prepolymer (E) and 3 parts by wt of a silicone-based surfactant (manufactured by Toray Dow Corning Silicone Co. with a trade name SH-193) were put into a polymerization vessel and mixed and the mixture was vacuum defoamed at an adjusted temperature of 80° C. Thereafter, the vacuum defoamed mixture was agitated with agitating blades at a rotation number thereof of 900 rpm vigorously for about 4 min so that cells were included into a reaction system. 26 parts by wt of 4,4'-methylenebis(o-chloroaniline) molten at temperature 120° C. in advance was added into the reaction mixture. After the reaction mixture was agitated for about 1 min, it was cast into an open mold of a pan type (casting mold). When the reaction mixture lost fluidity thereof, it was placed into an oven and post cured at 100° C. for 16 hr to obtain a polyurethane resin foam block.

The polyurethane resin foam block was used to manufacture a polishing pad in a similar way to that in Example 1.

Reference Example 1

A polishing pad was manufactured in a similar way to that in Comparative Example 1 with the exception that in Comparative Example 1, 20 parts by wt of BHEB in a molten state at a temperature of 140° C. was used instead of 26 parts by wt of 4,4'-methylenebis(o-chloroaniline) in a molten state at 120° C.

The polishing pads obtained in the examples, the comparative example and the reference example each were subjected to a polishing test to thereby evaluate a polishing characteristic. In Table 2, there are shown results thereof.

TABLE 2

| | Average cell diameter (μm) | Specific gravity | D hardness (degree) | Polishing speed (Å/min) | Local level difference (Å) | Wear (Å) |
|---|---|---|---|---|---|---|
| Example 1 | 50 | 0.87 | 56 | 2210 | 25 | 2430 |
| Example 2 | 51 | 0.86 | 54 | 2010 | 30 | 2520 |
| Example 3 | 50 | 0.87 | 55 | 2150 | 30 | 2500 |
| Example 4 | 50 | 0.86 | 57 | 2070 | 30 | 2460 |
| Example 5 | 52 | 0.87 | 56 | 2160 | 30 | 2380 |
| Example 6 | 52 | 0.86 | 54 | 2100 | 30 | 2510 |
| Comparative example 1 | 50 | 0.86 | 53 | 2200 | 25 | 3100 |
| Reference example 1 | 52 | 0.86 | 22 | 1200 | 55 | 3300 |

It is found from the results shown in Table 2 that a polishing pad of the invention is more excellent in a planarization characteristic and better in an environmental aspect due to being halogen free as compared with a conventional polishing pad.

EXAMPLES OF THE THIRD INVENTION

Example 1

484 parts by wt of 4,4'-dicyclohexylmethane diisocyanate (hereinafter referred to as HMDI for short), 462 parts by wt of polytetramethylene ether glycol with a number-average molecular weight of 1018 (hereinafter referred to as PTMG for short) and 54 parts by wt of diethylene glycol (hereinafter referred to as DEG for short) were put into a vessel to cause a reaction in the mixture at 80° C. for 2 hr to obtain an alicyclic isocyanate-terminated prepolymer. 100 parts by wt of the prepolymer and 3 parts by wt of a silicone-based surfactant (manufactured by Toray Dow Corning Silicone Co. with a trade name of SH-193 with a weight-average molecular weight of 3000, OH at the terminal of a side chain and EO/PO=100/0) were put into a polymerization vessel and mixed and the mixture was vacuum defoamed at an adjusted temperature of 80° C. Thereafter, the vacuum defoamed mixture was agitated with agitating blades at a rotation number thereof of 900 rpm vigorously for about 4 min so that cells were included into a reaction system. 14.4 parts by wt of ETACURE 100 (a mixture of 3,5-diethyl-2,4-toluenediamine and 3,5-diethyl-2,6-toluenediamin, manufactured by Albemal Co., Ltd.) at a temperature of 60° C. adjusted in advance was added into the reaction mixture. After the reaction mixture was agitated for about 1 min, it was cast into an open mold of a pan type (a casting vessel). When the reaction mixture lost fluidity thereof, it was placed into an oven and post cured at 110° C. for 8 hr to obtain a polyurethane resin foam block.

The polyurethane resin foam block was sliced with a slicer of a band saw type to obtain a polyurethane resin foam sheets. Then, a sheet was surface buffed to a thickness of 1.27 mm with a buffing machine (manufactured by Amitech, Inc.) to thereby obtain a sheet finished to a proper thickness precision. The buffed sheet was punched to form a circular hole with a diameter of 61 cm to obtain a circular sheet, and the circular sheet was grooved with a grooving machine to form concentric circular grooves with a groove width of 0.25 mm, a groove pitch of 1.50 mm and a groove depth of 0.40 mm thereon to thus prepare a polishing sheet. A double sided tape (manufactured by Sekisui Chemical Co., Ltd. with a trade name of Double Tac Tape) was adhered onto a surface on the other side of the polishing sheet from the grooved surface with a laminator. A corona-treated cushion sheet (a polyethylene foam manufactured by TORAY INDUSTRIES, INC. with a trade name of Toray PEF and a thickness of 0.8 mm) was surface buffed and adhered onto the double sided tape with a laminator. A double sided tape was further adhered onto the other surface of the cushion sheet with a laminator to thereby obtain a polishing pad Example 2

A polishing pad was manufactured in a similar way to that in Example 1 with the exception that in Example 1, 23 parts by wt of 4,4'-diamino-3,3'-diethyl-5,5'-dimethyldiphenylmethane in a molten state at a temperature of 100° C. was used instead of ETACURE 100 at a temperature of 60° C.

Example 3

A polishing pad was manufactured in a similar way to that in Example 1 with the exception that in Example 1, 20.9 parts by wt of 4,4'-diamino-3,3'-5,5'-tetraethyldiphenylmethane in a molten state at a temperature of 100° C. was used instead of ETACURE 100 at a temperature of 60° C.

Example 4

A polishing pad was manufactured in a similar way to that in Example 1 with the exception that in Example 1, L-5421 (manufactured by Nihonunica Corporation with a weight-average molecular weight of 3150, OH at the terminal of a side chain and EO/PO=100/0) was used instead of SH-193, which was a silicone-based surfactant.

Example 5

A polishing pad was manufactured in a similar way to that in Example 1 with the exception that in Example 1, SF-2937F (manufactured by Toray Dow Corning Silicone Co. with a weight-average molecular weight of 3500, OH at the terminal of a side chain and EO/PO=75/25) was used instead of SH-193, which was a silicone-based surfactant.

Example 6

A polishing pad was manufactured in a similar way to that in Example 1 with the exception that in Example 1, 17 parts by wt of ETACURE 300 (a mixture of 3,5-bis(methylthio)-2,4-toluenediamine and 3,5-bis(methylthio)-2,6-toluenediamine manufactured by Albemal Co., Ltd.) at a temperature of 60° C. was used instead of ETACURE 100 at a temperature of 60° C.

Example 7

A polishing pad was manufactured in a similar way to that in Example 1 with the exception that in Example 1, 25 parts by wt of 4,4'-diamino-3,3'-diisopropyl-5,5'-dimethyldiphenylmethane in a molten state at a temperature of 120° C. was used instead of ETACURE 100 at a temperature of 60° C.

Example 8

A polishing pad was manufactured in a similar way to that in Example 1 with the exception that in Example 1, 30 parts by wt of 4,4'-diamino-3,3'-5,5'-tetraisopropyldiphenylmethane in a molten state at a temperature of 120° C. was used instead of ETACURE 100 at a temperature of 60° C.

Example 9

A polishing pad was manufactured in a similar way to that in Example 1 with the exception that in Example 1, 40 parts by wt of polytetramethylene oxide-di-p-aminobenzoate (manufactured by Ihara Chemical Industries Co., Ltd. with a trade name of Elasmer 250P and an average polymerization degree of 3.2) in a molten state at a temperature of 120° C. was used instead of ETACURE 100 at a temperature of 60° C.

Example 10

A polishing pad was manufactured in a similar way to that in Example 1 with the exception that in Example 1, S824-02 (manufactured by Nihonunica Corporation with a weight-average molecular weight of 3700, alcoxyl groups at the terminals of all the side chains and EO/PO=100/0) was used instead of SH-193, which was a silicone-based surfactant.

Example 11

A polishing pad was manufactured in a similar way to that in Example 1 with the exception that in Example 1, SZ-1712 (manufactured by Nihonunica Corporation with a weight-average molecular weight of 4310, alcoxyl groups at the terminals of all the side chains and EO/PO=81/19) was used instead of SH-193, which was a silicone-based surfactant.

Comparative Example 1

341 parts by wt of toluene diisocyanate (a mixture of toluene 2,4-diisocyanate/toluene 2,6-diisocyanate=80/20), 76 parts by wt of HMDI, 528 parts by wt of PTMG and 55 parts by wt of DEG were put into a vessel to cause a reaction in the mixture at 80° C. for 2 hr to obtain an isocyanate-terminated prepolymer.

100 parts by wt of the prepolymer and 3 parts by wt of a silicone-based surfactant (manufactured by Toray Dow Corning Silicone Co. with a trade name of SH-193) were put into a polymerization vessel and mixed and the mixture was vacuum defoamed at an adjusted temperature of 80° C. Thereafter, the vacuum defoamed mixture was agitated with agitating blades at a rotation number thereof of 900 rpm vigorously for about 4 min so that cells were included into a reaction system. 26 parts by wt of 4,4'-methylenebis(o-chloroaniline) melted at temperature of 120° C. in advance was added into the reaction mixture. After the reaction mixture was agitated for about 1 min, it was cast into an open mold of a pan type (casting mold). When the reaction mixture lost fluidity thereof, it was placed into an oven and post cured at 110° C. for 8 hr to obtain a polyurethane resin foam block.

The polyurethane resin foam block was used to manufacture a polishing pad in a similar way to that in Example 1.

Comparative Example 2

387 parts by wt of toluene diisocyanate (a mixture of toluene 2,4-diisocyanate/toluene 2,6-diisocyanate=80/20), 549 parts by wt of PTMG and 64 parts by wt of DEG were put into a vessel to cause a reaction in the mixture at 80° C. for 2 hr to obtain an isocyanate-terminated prepolymer.

100 parts by wt of the prepolymer and 3 parts by wt of a silicone-based surfactant (SH-193) were put into a polymerization vessel and mixed and the mixture was vacuum defoamed at an adjusted temperature of 80° C. Thereafter, the vacuum defoamed mixture was agitated with agitating blades at a rotation number thereof of 900 rpm vigorously for about 4 min so that cells were included into a reaction system. 17 parts by wt of ETACURE 100 heated at 60° C. in advance was added into the reaction mixture. After the reaction mixture was agitated for about 1 min, casting thereof was tried into an open mold of a pan type (casting mold), only to fail to do so because of an excessively fast reaction.

Reference Example 1

A polishing pad was manufactured in a similar way to that in Example 1 with the exception that in Example 1, a quantity of the silicon-based surfactant was altered to 0.03 parts by wt from the original 3 parts by wt.

Reference Example 2

A polishing pad was manufactured in a similar way to that in Example 1 with the exception that in Example 1, a quantity of the silicon-based surfactant was altered to 30 parts by wt from the original 3 parts by wt.

The polishing pads obtained in the examples, the comparative example and the reference examples each were subjected to a polishing test to thereby evaluate polishing characteristics. In Table 3, there are shown results of the evaluation.

It is found from the results of Table 3 that polishing pads of the invention are more excellent in planarization characteristic and besides, also more excellent in an environmental aspect as compared with conventional polishing pads. With a specific silicone-based surfactant used, a polishing rate and in-plane uniformity can be improved.

EXAMPLES OF THE FOURTH INVENTION

Example 1

1206 parts by wt of toluene diisocyanate (a mixture of toluene 2,4-diisocyanate/toluene 2,6-diisocyanate=80/20, hereinafter referred to as TDI for short), 253 parts by wt of an urethane-modified polymerized 1,6-hexamethylene diisocyanate (including 42 wt % of a trimer, 27 wt % of a pentamer and 13 wt % of a heptamer of an isocyanurate type, manufactured by Nippon Polyurethane Industry Co., Ltd. with a trade name of COLONATE HX), 1954 parts by wt of polytetramethylene ether glycol (hereinafter referred to as PTMG for short) with a number-average molecular weight of 1018 and 188 parts by wt of diethylene glycol (hereinafter referred to as DEG for short) were put into a vessel to cause a reaction in the mixture at 70° C. for 4 hr to obtain an isocyanate-terminated prepolymer A. Note that COLONATE HX/TDI (in wt ratio) was 17/83.

100 parts by wt of the prepolymer and 3 parts by wt of a silicone-based nonionic surfactant (manufactured by Nihonunica Corporation with a trade name of L-5340) were put into a polymerization vessel and mixed and the mixture was vacuum defoamed at an adjusted temperature of 80° C. Thereafter, the vacuum defoamed mixture was agitated with agitating blades at a rotation number thereof of 900 rpm vigorously for about 4 min so that cells were included into a reaction system. 26 parts by wt of 4,4'-methylenebis(o-chloroaniline) (hereinafter referred to as MOCA for short) melted at a temperature of 120° C. in advance was added into the reaction mixture. After the reaction mixture was agitated for about 1 min, it was cast into an open mold of a pan type (casting mold). When the reaction mixture lost fluidity thereof, it was placed into an oven and post cured at 100° C. for 16 hr to obtain a polyurethane resin foam block.

The polyurethane resin foam block at about 80° C. was sliced with a slicer (manufactured by Amitech, Inc. with a model number of VGW-125) to obtain a polyurethane resin

TABLE 3

| | Average cell diameter (μm) | Standard deviation | Specific gravity | Hardness (degrees) | Polishing rate (Å/min) | Local level difference (Å) | Wear (Å) | In-plane uniformity (%) |
|---|---|---|---|---|---|---|---|---|
| Example 1 | 52 | 7.67 | 0.88 | 54 | 2310 | 25 | 2300 | 8 |
| Example 2 | 51 | 7.89 | 0.87 | 53 | 2200 | 30 | 2500 | 9 |
| Example 3 | 51 | 7.92 | 0.87 | 52 | 2170 | 30 | 2450 | 9 |
| Example 4 | 52 | 7.61 | 0.86 | 52 | 2150 | 25 | 2400 | 8 |
| Example 5 | 50 | 7.62 | 0.87 | 54 | 2250 | 30 | 2350 | 8 |
| Example 6 | 52 | 7.71 | 0.86 | 53 | 2130 | 30 | 2500 | 8 |
| Example 7 | 51 | 7.59 | 0.87 | 52 | 2170 | 30 | 2550 | 9 |
| Example 8 | 53 | 7.75 | 0.87 | 53 | 2160 | 30 | 2500 | 8 |
| Example 9 | 52 | 7.81 | 0.86 | 52 | 2100 | 30 | 2600 | 9 |
| Example 10 | 54 | 8.58 | 0.86 | 51 | 2030 | 30 | 2600 | 12 |
| Example 11 | 53 | 8.46 | 0.86 | 51 | 2070 | 30 | 2650 | 12 |
| Comparative example 1 | 54 | 8.95 | 0.86 | 53 | 1950 | 35 | 3050 | 14 |
| Reference example 1 | 54 | 8.71 | 0.88 | 53 | 2100 | 30 | 2740 | 13 |
| Reference example 2 | 51 | 7.93 | 0.87 | 40 | 2000 | 30 | 2920 | 9 | foam sheets. Then, a sheet was surface buffed to a thickness of 1.27 mm with a buffing machine (manufactured by Amitech, Inc.) to thereby obtain a sheet finished to a proper thickness precision. The buffed sheet was punched to form a circular hole with a diameter of 61 cm to obtain a circular sheet, and the circular sheet was grooved with a grooving machine (manufactured by Techno Co.) to form concentric circular grooves with a groove width of 0.25 mm, a groove pitch of 1.50 mm and a groove depth of 0.40 mm thereon to thus prepare a polishing sheet. A double sided tape (manufactured by Sekisui Chemical Co., Ltd. with a trade name of Double Tac Tape) was adhered onto a surface on the other side of the polishing sheet from the grooved surface with a laminator. A corona-treated cushion sheet (a polyethylene foam manufactured by TORAY INDUSTRIES, INC. with a trade name of Toray PEF and a thickness of 0.8 mm) was surface buffed and adhered onto the double sided tape with a laminator. A double sided tape was further adhered onto the other surface of the cushion sheet with a laminator.

Example 2

1063 parts by wt of TDI, 471 parts by wt of COLONATE HX, 1885 parts by wt of PTMG and 181 parts by wt of DEG were put into a vessel to cause a reaction in the mixture at 70° C. for 4 hr to obtain an isocyanate-terminated prepolymer B. Note that COLONATE HX/TDI (in wt ratio) was 31/69.

A polishing pad was manufactured in a similar way to that in Example 1 with the exception that in Example 1, the isocyanate-terminated prepolymer B was used instead of the isocyanate-terminated prepolymer A and a mixing quantity of MOCA was altered to 27 parts by wt from the original 26 parts by wt.

Example 3

882 parts by wt of TDI, 879 parts by wt of COLONATE HX and 1678 parts by wt of PTMG and 161 parts by wt of DEG were put into a vessel to cause a reaction in the mixture at 70° C. for 4 hr to obtain an isocyanate-terminated prepolymer C. Note that COLONATE HX/TDI (in wt ratio) was 50/50.

A polishing pad was manufactured in a similar way to that in Example 1 with the exception that in Example 1, the isocyanate-terminated prepolymer C was used instead of the isocyanate-terminated prepolymer A and a mixing quantity of MOCA was altered to 28 parts by wt from the original 26 parts by wt.

Example 4

A polishing pad was manufactured in a similar way to that in Example 2 with the exception that in Example 2, 21 parts by wt of a mixture of 3,5-bis(methylthio)-2,4-toluenediamine and 3,5-bis(methylthio)-2,6-toluenediamine (manufactured by Albemal Co., Ltd. with a trade name of ETACURE 300) was used instead of MOCA (27 parts by wt) melted at a temperature of 120° C. in advance.

Example 5

A polishing pad was manufactured in a similar way to that in Example 2 with the exception that in Example 2, 49 parts by wt of polytetramethylene oxide-di-p-aminobenzoate (manufactured by Ihara Chemical Industries Co., Ltd. with a trade name of Elasmer 250P and an average polymerization degree of 3.2) was used instead of MOCA (27 parts by wt) melted at a temperature of 120° C. in advance.

Example 6

1173 parts by wt of TDI, 298 parts by wt of polymerized 1,6-hexamethylene diisocyanate (55 wt % of a trimer, 22 wt % of a pentamer and 11 wt % of a heptamer of an isocyanurate type, manufactured by Sumica Bayer Urethane Co., Ltd. with a trade name of Sumijul N-3300), 1943 parts by wt of PTMG and 187 parts by wt of DEG were put into a vessel to cause a reaction in the mixture at 70° C. for 4 hr to obtain an isocyanate-terminated prepolymer D. Note that N-3300/TDI (in wt ratio) was 20/80.

A polishing pad was manufactured in a similar way to that in Example 1 with the exception that in Example 1, the isocyanate-terminated prepolymer D was used instead of the isocyanate-terminated prepolymer A.

Example 7

1169 parts by wt of TDI, 297 parts by wt of polymerized 1,6-hexamethylene diisocyanate (55 wt % of a trimer, 22 wt % of a pentamer and 11 wt % of a heptamer of a biuret type, manufactured by Sumica Bayer Urethane Co., Ltd. with a trade name of Sumijul N-3200), 1947 parts by wt of PTMG and 187 parts by wt of DEG were put into a vessel to cause a reaction in the mixture at 70° C. for 4 hr to obtain an isocyanate-terminated prepolymer E. Note that N-3200/TDI (in wt ratio) was 20/80.

A polishing pad was manufactured in a similar way to that in Example 1 with the exception that in Example 1, the isocyanate-terminated prepolymer E was used instead of the isocyanate-terminated prepolymer A.

Example 8

1058 parts by wt of TDI, 582 parts by wt of polymerized 1,6-hexamethylene diisocyanate (of a trimethylolpropane adduct type, manufactured by Nippon Polyurethane Industry Co., Ltd. with a trade name of COLONATE HL as a 75% ethyl acetate solution), 1788 parts by wt of PTMG and 172 parts by wt of DEG were put into a vessel to cause a reaction in the mixture at 70° C. for 4 hr to obtain an isocyanate-terminated prepolymer F. Note that COLONATE HL/TDI (in wt ratio) was 29/71.

A polishing pad was manufactured in a similar way to that in Example 2 with the exception that in Example 2, the isocyanate-terminated prepolymer F was used instead of the isocyanate-terminated prepolymer B and a mixing quantity of MOCA was altered to 24 parts by wt from the original 27 parts by wt.

Comparative Example 1

1229 parts by wt of TDI, 272 parts by wt of 4,4'-dicyclohexylmethane diisocyanate, 1901 parts by wt of PTMG and 198 parts by wt of DEG were put into a vessel to cause a reaction in the mixture at 70° C. for 4 hr to obtain an isocyanate-terminated prepolymer G.

A polishing pad was manufactured in a similar way to that in Example 1 with the exception that in Example 1, the isocyanate-terminated prepolymer G was used instead of the isocyanate-terminated prepolymer A and a mixing quantity of MOCA was altered to 30 parts by wt from the original 26 parts by wt.

Comparative Example 2

1350 parts by wt of TDI, 2053 parts by wt of PTMG and 197 parts by wt of DEG were put into a vessel to cause a reaction in the mixture at 70° C. for 4 hr to obtain an isocyanate-terminated prepolymer H.

A polishing pad was manufactured in a similar way to that in Example 1 with the exception that in Example 1, the isocyanate-terminated prepolymer H was used instead of the isocyanate-terminated prepolymer A.

Reference Example 1

631 parts by wt of TDI, 1352 parts by wt of COLONATE HX, 1476 parts by wt of PTMG and 142 parts by wt of DEG were put into a vessel to cause a reaction in the mixture at 70° C. for 4 hr to obtain an isocyanate-terminated prepolymer I. Note that COLONATE HX/TDI (in wt ratio) was 68/32.

A polishing pad was manufactured in a similar way to that in Example 1 with the exception that in Example 1, the isocyanate-terminated prepolymer I was used instead of the isocyanate-terminated prepolymer A and a mixing quantity of MOCA was altered to 29 parts by wt from the original 26 parts by wt.

The polishing pads obtained in the examples and the comparative examples each were subjected to a polishing test to thereby evaluate polishing characteristics. In Table 4, there are shown results of the evaluation.

TABLE 4

|  | Average cell diameter (μm) | Specific gravity | D hardness (degrees) | Polishing speed (Å/min) | Local level difference (Å) | Wear (Å) | Dressing speed (μm/min) |
|---|---|---|---|---|---|---|---|
| Example 1 | 54.5 | 0.86 | 54 | 2150 | 25 | 2900 | 5.0 |
| Example 2 | 53.3 | 0.86 | 54 | 2200 | 25 | 2900 | 5.2 |
| Example 3 | 53.8 | 0.86 | 54 | 2180 | 25 | 2950 | 6.4 |
| Example 4 | 48.5 | 0.86 | 54 | 2260 | 25 | 2850 | 5.3 |
| Example 5 | 52.7 | 0.86 | 54 | 2160 | 25 | 2900 | 5.4 |
| Example 6 | 53.5 | 0.86 | 54 | 2250 | 25 | 2850 | 6.0 |
| Example 7 | 52.9 | 0.86 | 54 | 2230 | 25 | 2850 | 5.8 |
| Example 8 | 51.9 | 0.86 | 54 | 2140 | 25 | 2950 | 5.7 |
| Comparative example 1 | 55.0 | 0.85 | 53 | 2010 | 30 | 3000 | 4.0 |
| Comparative example 2 | 54.8 | 0.85 | 53 | 2090 | 30 | 2900 | 4.2 |
| Reference example 1 | 59.6 | 0.84 | 55 | 2050 | 30 | 3100 | 10.5 |

It is clear from the results of Table 4 that polishing pads of the invention using a polymerized diisocyanate and an aromatic diisocyanate as isocyanate components each are improved on dressability while a planarization characterization characteristic and a polishing speed are maintained. Since, with the polishing pad used, a dressing time can be shortened, a fabrication efficiency of semiconductor wafers can be dramatically increased.

The invention claimed is:

1. A method for manufacturing a polishing pad, comprising mixing a first component containing an isocyanate-terminated prepolymer into a second component containing a chain extender for curing to produce a polyurethane resin foam,
   wherein the mixing comprises adding a silicone-based surfactant into the first component in the range of 0.05 to 10 wt % based on the polyurethane resin foam, agitating the first component together with a non-reactive gas to thereby prepare a cell dispersion liquid in which the non-reactive gas is dispersed as fine cells and thereafter mixing the second component into the cell dispersion liquid for curing to thereby produce a polyurethane resin foam,
   wherein the chain extender is an aromatic polyamine with a melting point of 70° C. or lower, and
   wherein the aromatic polyamine is at least one selected from the group consisting of N,N'-di-sec-butyl-4,4'-diaminodiphenylmethane, 3,3'-diethyl-4,4'-diaminodiphenylmethane, m-xylylenediamine, N,N'-di-sec-butyl-p-phenylenediamine, m-phenylenediamine, p-xylylenediamine, and a polyalkylene oxide-di-p-aminobenzoate expressed by the following general formula (1):

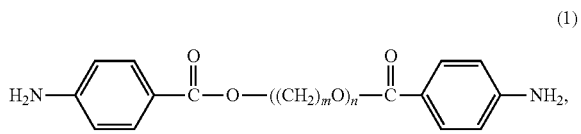

$$(1)$$

wherein m is 4 and n is an integer from 2 to 5.

2. The method of claim 1, wherein the isocyanate-terminated prepolymer contains a low-molecular-weight polyol as a raw material component.

3. The method of claim 1, wherein the isocyanate-terminated prepolymer is formed from an isocyanate component comprising an aromatic diisocyanate and an alicyclic diisocyanate as raw materials.

4. The method of claim 3, wherein the aromatic diisocyanate is toluene diisocyanate and the alicyclic diisocyanate is dicyclohexylmethane diisocyanate.

5. A polishing pad made by the method of claim 1.

6. A polishing pad having a polishing layer made from a polyurethane resin foam, wherein the polyurethane resin foam is a reaction-cured product between an aliphatic and/or alicyclic isocyanate-terminated prepolymer and a chain extender containing at least one kind of a halogen free aromatic amine selected from the group consisting of compounds expressed by the following general formulae (3) and (4):

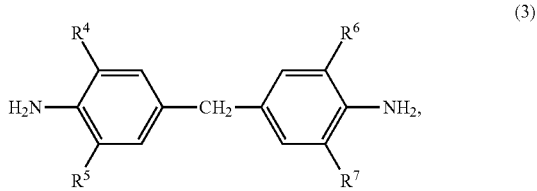

(3)

wherein in the general formula (3), R4 to R7, each independently of the others, H or an alkyl group having 1 to 4 carbon atoms, and R4 to R7 are chosen so that the general formula (3) does not include 4,4'-diamino-3,3'-diethyl-5,5'-dimethyldiphenylmethane, and

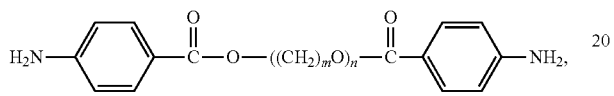

(4)

wherein m is 4 and n is an integer from 1 to 5.

7. The polishing pad of claim 6, wherein an isocyanate component constituting the alicyclic isocyanate-terminated prepolymer is 4,4'-dicyclohexylmethane diisocyanate.

8. The polishing pad of claim 6, wherein a high-molecular-weight polyol constituting the aliphatic and/or alicyclic isocyanate-terminated prepolymer is tetramethylene ether glycol with a number-average molecular weight in the range of from 500 to 1500.

9. The polishing pad of claim 6, wherein the aliphatic and/or alicyclic isocyanate-terminated prepolymer contains a low-molecular-weight polyol as a raw material component.

10. A method for manufacturing a polishing pad, comprising mixing a first component containing an isocyanate-terminated prepolymer into a second component containing a chain extender for curing to produce a polyurethane resin foam, wherein the mixing comprises adding a silicone-based surfactant into the first component containing isocyanate-terminated prepolymer in the range of from 0.05 to 10 wt % based on the polyurethane resin foam, agitating the first component together with a non-reactive gas to thereby prepare a cell dispersion liquid in which the non-reactive gas is dispersed as fine cells and thereafter mixing the second component containing a chain extender into the cell dispersion liquid for curing to produce a polyurethane resin foam, and the isocyanate-terminated prepolymer is an aliphatic and/or alicyclic isocyanate-terminated prepolymer and the chain extender contains at least one kind of a halogen free aromatic amine selected from the group consisting of compounds expressed by the following general formulae (3) and (4):

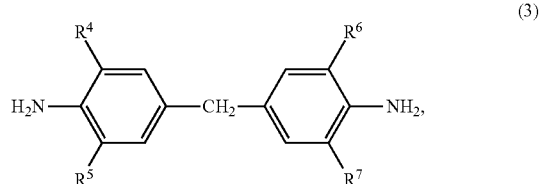

(3)

wherein in the general formula (3), R4 to R7, each independently of the others, H or an alkyl group having 1 to 4 carbon atoms, and R4 to R7 are chosen so that the general formula (3) does not include 4,4'-diamino-3,3'-diethyl-5,5'-dimethyldiphenylmethane, and

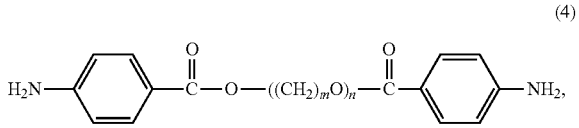

(4)

wherein m is 4 and n is an integer from 1 to 5.

11. The method of claim 10, wherein the silicone-based surfactant contains a silicone resin in the range of from 1000 to 6000 in weight-average molecular weight and a molar ratio of ethylene oxide/propylene oxide is in the range of from 70/30 to 100/0.

12. The method of claim 11, wherein the silicone resin has a hydroxyl group at the terminal end of a side chain of a siloxane skeleton.

\* \* \* \* \*